United States Patent [19]

Tanaka et al.

[11] Patent Number: 4,526,557
[45] Date of Patent: Jul. 2, 1985

[54] METHOD AND APPARATUS FOR CONTROLLING A CONTINUOUSLY VARIABLE TRANSMISSION

[75] Inventors: Yoshikazu Tanaka, Yokohama; Hiroyuki Hirano; Keiju Abo, both of Yokosuka; Haruyoshi Kumura, Yokohama; Sigeaki Yamamuro, Zushi; Yoshiro Morimoto, Yokosuka, all of Japan

[73] Assignee: Nissan Motor Co., Ltd., Yokohama, Japan

[21] Appl. No.: 496,255

[22] Filed: May 19, 1983

[30] Foreign Application Priority Data

May 20, 1982 [JP] Japan .................................. 57-83926

[51] Int. Cl.³ ...................... F16H 11/06; F16H 47/00; B60K 41/14; B60K 41/22
[52] U.S. Cl. ........................................ 474/18; 474/17; 74/857; 74/861
[58] Field of Search ............... 474/17, 18, 28; 74/866, 74/861, 857

[56] References Cited

U.S. PATENT DOCUMENTS 4,291,594  9/1981  Baudoin .
4,387,608  6/1983  Mohl et al. ............................ 474/18

FOREIGN PATENT DOCUMENTS 0038083  10/1981  European Pat. Off. .............. 74/866
0040301  11/1981  European Pat. Off. .
0044461  1/1982   European Pat. Off. .
0061735  10/1982  European Pat. Off. .
2385902  10/1978  France .

Primary Examiner—Stephen J. Novosad
Assistant Examiner—Bruce M. Kisliuk
Attorney, Agent, or Firm—Schwartz, Jeffery, Schwaab, Mack, Blumenthal & Evans

[57] ABSTRACT

A continuously variable transmission includes a hydrodynamic device, such as a fluid coupling or a torque converter, having a lock-up clutch. The reduction ratio of the continuously variable transmission is controlled by a shift motor. The shift motor is controlled such that each of rotary positions thereof corresponds uniquely to a desired optimum reduction ratio. Upon detecting a state wherein a rapid down shift is needed, the lock-up clutch is temporarily disengaged to allow the hydrodynamic device to slip during the rapid down shift.

12 Claims, 27 Drawing Figures

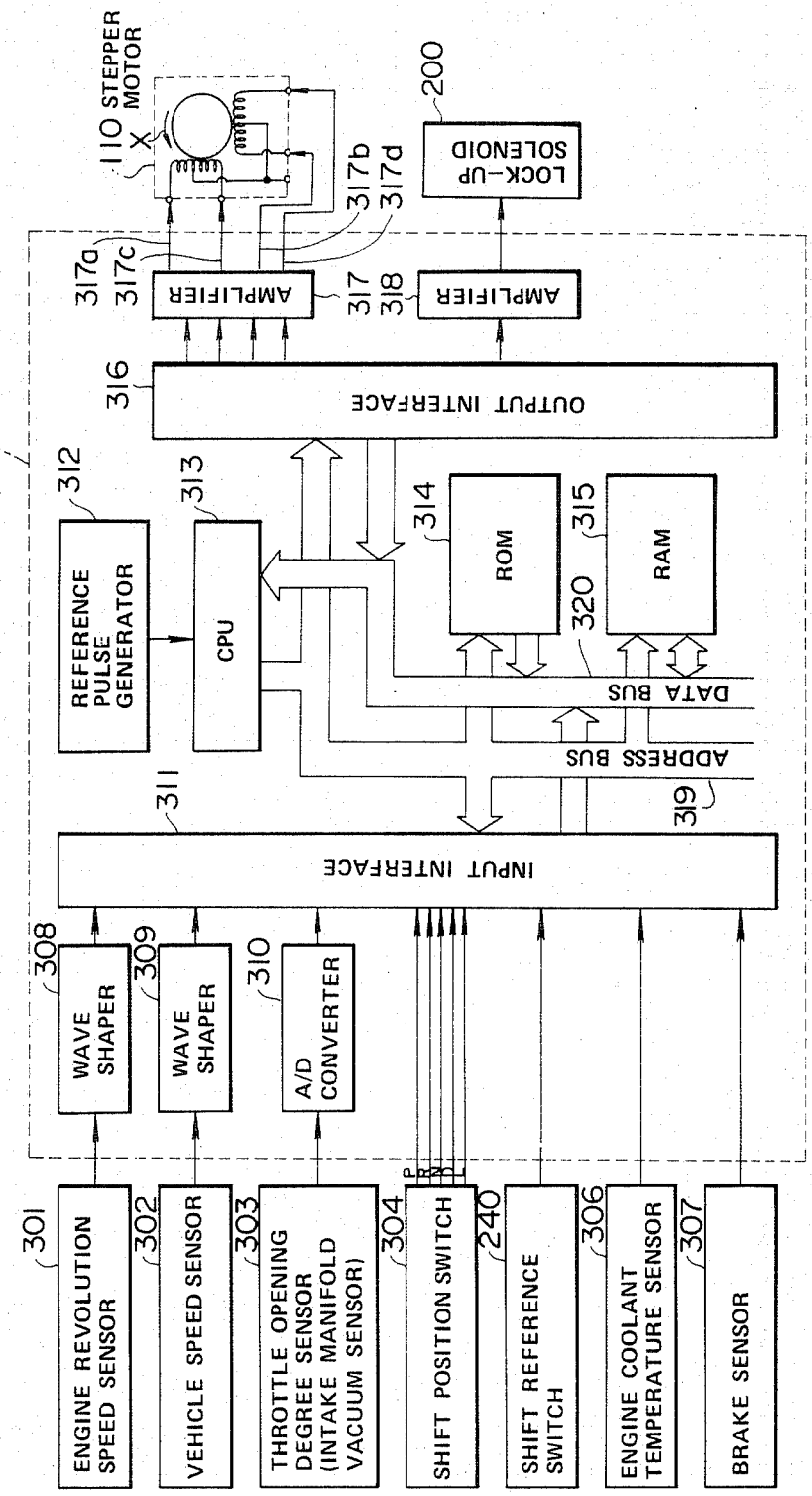

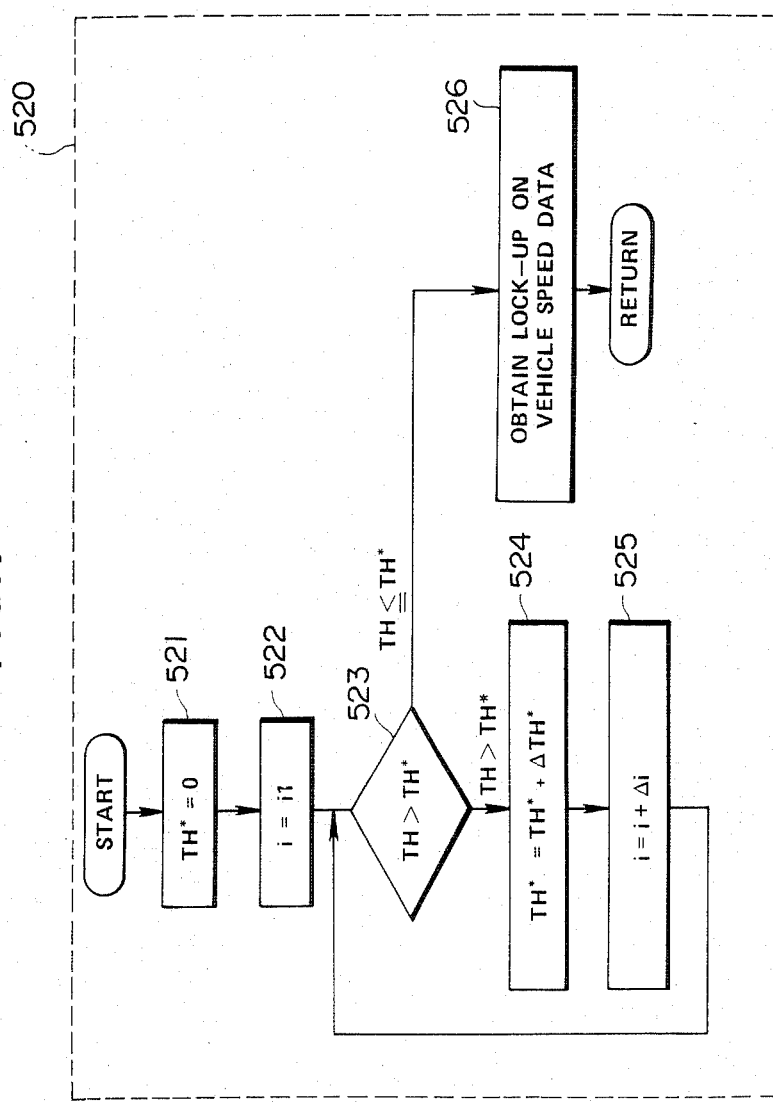

|  | A | B | C | D |
|---|---|---|---|---|
| 317 a | H | L | L | H |
| 317 c | H | H | L | L |
| 317 b | L | H | H | L |
| 317 d | L | L | H | H |

⟶ UPSHIFT
⟵ DOWNSHIFT

METHOD AND APPARATUS FOR CONTROLLING A CONTINUOUSLY VARIABLE TRANSMISSION

BACKGROUND OF THE INVENTION

The present invention relates to a method and an apparatus for controlling a continuously variable transmission, and more particularly to a method and an apparatus for controlling a lock-up clutch of a hydrodynamic device of a continuously variable transmission of an automotive vehicle.

The term "hydrodynamic device" is used herein to refer to a fluid coupling and a torque converter.

In a method for controlling a continuously variable V-belt transmission which was previously proposed in pending Japanese Patent Application No. 56-44749 filed Mar. 28, 1981 which corresponds to copending U.S. patent application Ser. No. 362,489 filed Mar. 26, 1982 and commonly assigned herewith, a lock-up clutch was engaged at vehicle speeds above a relatively low vehicle speed value for better fuel economy by eliminating a power loss due to slip in the hydrodynamic device, and the engagement of the lock-up clutch was released only in a low vehicle speed operating range in order to prevent the occurrence of unpleasant vibrations at low speeds, and to secure a traction force great enough for moving the vehicle from standstill.

However, with the above method, the acceleration performance was not satisfactory because the hydrodynamic device was maintained in its engaged condition even when the transmission was to shift down to a large reduction ratio to meet a rapid acceleration demand. The engine could not increase its speed promptly for greater torque.

SUMMARY OF THE INVENTION

An object of the present invention is to provide a method and an apparatus for controlling a continuously variable transmission including a hydrodynamic device with a lock-up clutch wherein the engine is allowed to increase its speed for greater torque when a rapid acceleration is needed.

More particularly, an object of the present invention is to allow the engine to increase its speed by disengaging temporarily the lock-up clutch upon detecting a state wherein a rapid down shift is needed to meet a rapid acceleration demand.

According to the present invention, there is provided a method for controlling a continuously variable transmission which includes a hydrodynamic device having an input element and an output element, a drive pulley connected to the input element, a driven pulley, a V-belt running over the drive and driven pulleys, and a lock-up clutch engageable to mechanically connect the input element with the output element, the transmission being shiftable between different reduction ratios and having a shift motor which is movable to different positions for effecting shifting to diffeent reduction ratios, the method comprising:

detecting a state wherein a rapid down shift is needed and generating a rapid down shift need indicative signal; and disengaging the lock-up clutch in response to said rapid down shift need indicative signal so as to allow the hydrodynamic device to slip during the down shift.

According to the present invention, there is provided an apparatus for controlling a continuously variable transmission of an automotive vehicle having an internal combustion engine, the transmission including a hydrodynamic device having an input element and an output element, a drive pulley, a driven pulley, a V-belt running over the drive and driven pulleys, and a lock-up clutch engageable to mechanically connect the input element to said output element, the transmission being shiftable between different reduction ratios, the apparatus comprising:

means including a shift motor movable to different positions for shifting the transmission to different reduction ratios corresponding uniquely to said positions;

means for detecting a state wherein a rapid down shift is needed and generating a rapid down shift need indicative signal; and means for disengaging the lock-up clutch in response to said rapid down shift need indicative signal to allow the hydrodynamic device to slip during the down shift.

According to the present invention, there is provided an apparatus for controlling a continuously variable transmission of an automotive vehicle having an internal combustion engine, the transmission including a hydrodynamic device having an input element and an output element, a drive pulley, a driven pulley, a V-belt running over the drive and driven pulleys, and a lock-up clutch engageable to mechanically connect the input element to the output element, the transmission being shiftable between the reduction ratios, the apparatus comprising:

means for detecting a vehicle speed of the automotive vehicle and generating a vehicle speed indicative signal;

means for detecting an engine load on the internal combustion engine;

means for retrieving a desired optimum reduction ratio for the detected vehicle speed and engine load and generating a desired optimum reduction ratio indicative signal;

means for generating an actual reduction ratio indicative signal representing an actual reduction ratio of the continuously variable transmission;

means for comparing the actual reduction ratio indicative signal with the desired optimum reduction ratio indicative signal to compute a difference therebetween and generating a difference indicative signal representing said difference;

means for comparing said difference with a predetermined value and generating a rapid down shift need indicative signal when said difference is greater than said predetermined value;

a shift motor rotatable between a plurality of rotary positions thereof;

means operatively connected to said shift motor to be actuated thereby for shifting the transmission to a reduction ratio corresponding to one of the plurality of rotary positions of said shift motor assumed by said shift motor;

means responsive to said vehicle speed indicative signal for engaging the lock-up clutch; and means for disengaging the lock-up clutch temporarily in response to said rapid down shift need indicative signal so as to allow said hydrodynamic device to slip during the rapid down shift.

BRIEF DESCRIPTION OF THE DRAWINGS

The present invention is more specifically described in connection with the accompanying drawings, wherein:

FIG. 4 is a block diagram showing a control unit for controlling a stepper motor 110 and a lock-up solenoid 200 shown in FIG. 3;

FIG. 7 is a flow chart showing a data retrieval routine for lock-up on vehicle speed data;

DETAILED DESCRIPTION OF THE INVENTION

Referring to the accompanying drawings, the present invention is described hereinafter in connection with preferred embodiments.

Figure 1:
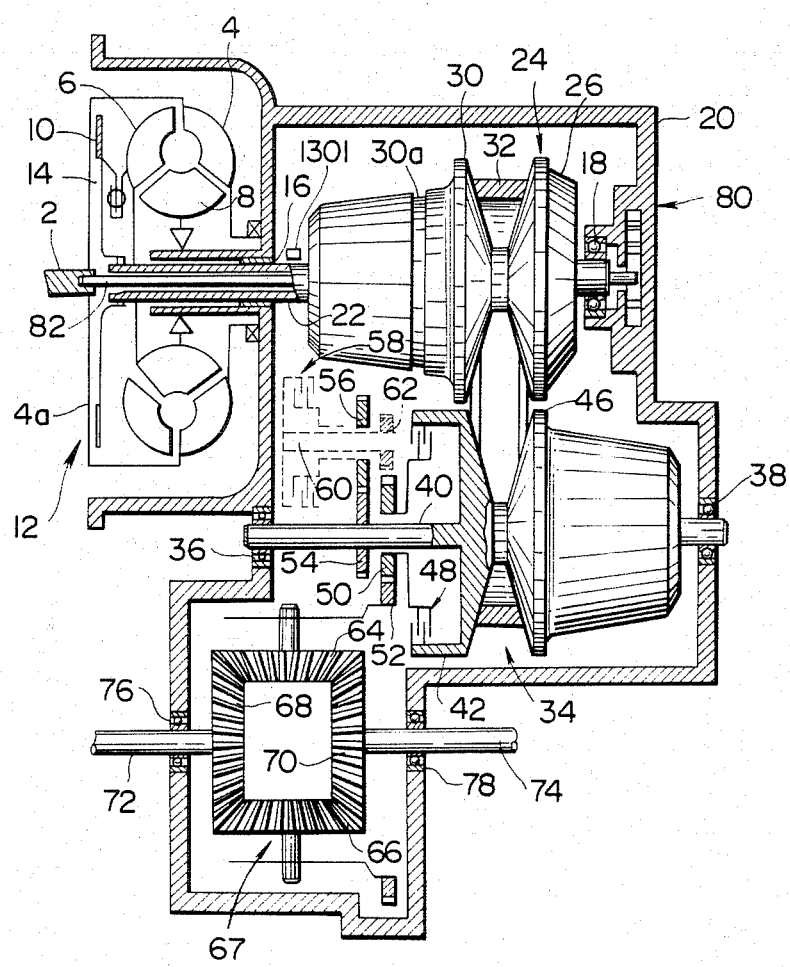
FIG. 1 is a diagrammatic cross sectional view illustrating a power transmission mechanism of a continuously variable V-belt transmission.
Figure 2:
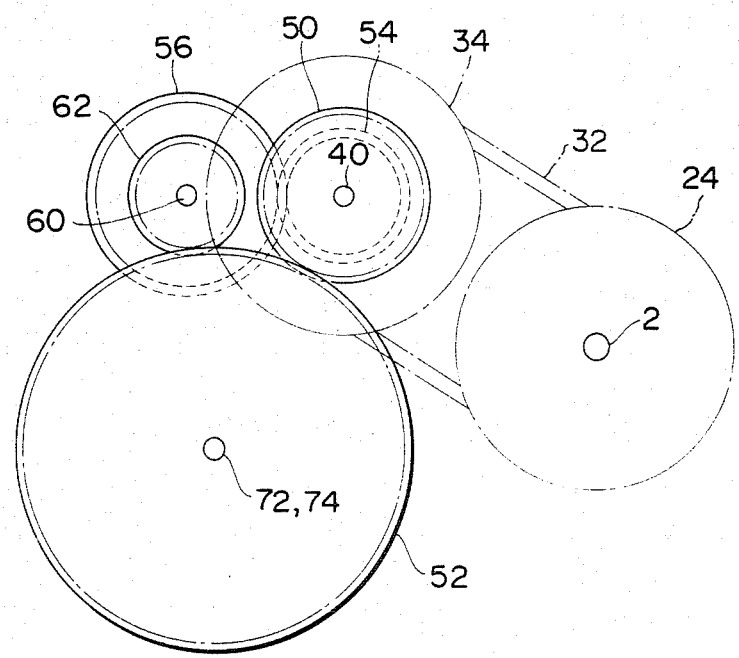
FIG. 2 is a layout of the shafts of the transmission mechanism shown in FIG. 1.

Referring to FIG. 1, a torque converter 12 (which may be replaced with a fluid coupling) includes a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14. The lock-up clutch 10 operates such that when the oil pressure within the lock-up clutch oil chamber 14 becomes lower than that within the interior of the torque converter 12, the lock-up clutch 10 is pressed against the member 4a by the pressure difference to come into a unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 secured to the drive shaft 22 and an axially movable conical disc 30 which is so disposed as to face the axially fixed conical disc 26 to define a V-shaped pulley groove therebetween and which is controllably movable in an axial direction of the driven shaft 22 in response to an oil pressure created within a drive pulley cylinder chamber 28 (see FIG. 3). For limiting the maximum width of the V-shaped pulley groove, an annular member 22a is fixed to the drive shaft 22 and so disposed as to engage the driven pulley 34 (see FIG. 3). The drive pulley 24 is drivingly connected to a driven pulley 34 via a V-belt 32. The V-belt 32 runs over the drive pulley 24 and the driven pulley 34. The driven pulley 34 is arranged on a driven shaft 40 which is rotatably supported by the case 20 via the bearings 36 and 38. The driven pulley 34 comprises an axially fixed conical disc 42 secured to the driven shaft 40 and an axially movable conical disc 46 which is so disposed as to face the fixed conical disc 42 in such a manner as to define a V-shaped pulley groove and which is controllably movable in an axial direction of the drive shaft 40 in response to an oil pressure created in a driven pulley cylinder chamber 44 (see FIG. 3). Similarly to the drive pulley 24, an annular member 40a is fixed to the driven shaft 40 to limit the movement of the axially slidable conical disc 46 so as to define the maximum width of the V-shaped pulley groove. The aixally fixed conical disc 42 is drivingly connectable via a forward drive multiple disc clutch 48 to a forward drive gear 50 rotatably supported on the driven shaft 40, this forward drive gear being in mesh with a ring gear 52. Fixedly mounted to the driven shaft 40 is a reverse drive gear 54 which is in mesh with an idler gear 56. The idler gear 56 is drivingly connectable via a reverse drive multiple disc clutch 58 to an idler shaft 60 which has fixed thereto another idler gear 62 that is in mesh with the ring gear 52. In FIG. 1, the idler gear 62, idler shaft 60 and reverse drive multiple disc clutch 54 are illustrated in positions displaced from the actual positions thereof for ease of illustration, the idler gear 62 and ring gear 52 are shown as out of mesh with each other. But, they are actually in mesh with each other as shown in FIG. 2. The ring gear 52 has attached thereto a pair of pinion gears 64 and 66. A pair of axle or output shafts 72 and 74 are coupled with side gears 68 and 70, respectively, which are in mesh with the pinion gears 64 and 66 to cooperate to form a differential 67. The axle shafts 72 and 74 are supported via bearings 76 and 78, respectively, extend outwardly of the case 20 in the opposite directions and are connected to road wheels (not shown), respectively. As viewed in FIG. 1, there is arranged on the righthand side of the bearing 18 an oil pump 80 of the internally toothed gearing type which serves as a source of oil pressure, this oil pump 80 being driven by the engine output shaft 2 via an oil pump drive shaft 82 extending through the hollow driven shaft 22.

Rotary power fed from the engine output shaft 2 is transmitted via the torque converter 12, drive shaft 22, drive pulley 24, V-belt 32, driven pulley 34 to driven shaft 40 and in the case the forward multiple disc clutch 48 is engaged, with the reverse drive multiple disc clutch 58 released, the rotation of the shaft 40 is transmitted via the forward drive gear 50, ring gear 52 and differential 67 to the axle shafts 72 and 74 to rotate them in the forward rotational direction, whereas, in the case the reverse drive multiple disc clutch 58 is engaged with the forward drive multiple disc clutch 48 released, the rotation of the shaft 40 is transmitted via the reverse drive gear 54, idler gear 56, idler shaft 60, idler gear 62, ring gear 52 and differential 67 to the axle shafts 72 and 74 to rotate them in the reverse rotational direction. During this transmission of power, the ratio between the rotation of the drive pulley 24 and that of the driven pulley 34 may be varied by moving the axially movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 will result in a reduction in radius of the diameter of the drive pulley 24 contacting with the V-belt 32 and an increase in radius of the diameter of the driven pulley 34 contacting with the V-belt 32, resulting in an increase in reduction ratio. As a result, a reduction ratio increases. If the axially movable conical discs 30 and 46 are moved in the respective reverse directions, a reduction ratio decreases. Depending upon the situations, the torque converter serves as a torque multiplier or serves as a fluid coupling but, since it has the lock-up clutch 10 as attached to the turbine runner 6, the torque converter 12 can establish a direct mechanical connection between the engine output shaft 2 and driven shaft 22 when the lock-up clutch oil chamber 14 is drained, thus pressing the lock-up clutch 10 against the member 4a integral with the pump impeller 4.

Figure 3:
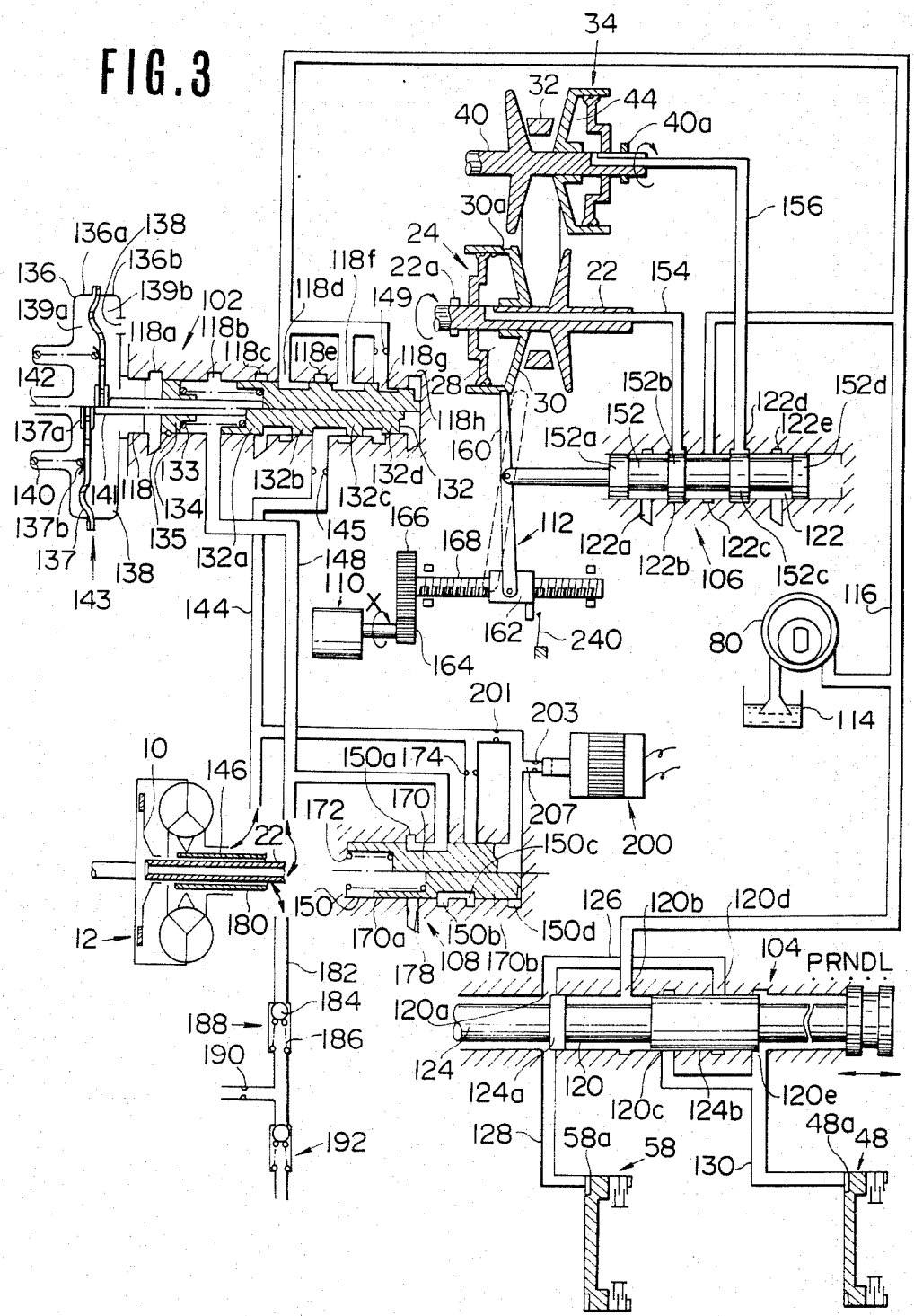
FIG. 3 is a view showing a hydraulic control system for the continuously variable V-belt transmission shown in FIGS. 1 and 2.

Referring to FIG. 3, a hydraulic control system for the continuously variable transmission is explained. As shown in FIG. 3, the control system comprises an oil pump 80, a line pressure regulator valve 102, a manual valve 104, a shift control valve 106, a lock-up valve 108, a shift motor 110, and a shift operating mechanism 112.

The oil pump 80 which is driven by the engine output shaft 2 draws off the oil from the tank 114 and discharges the oil under pressure into the oil conduit 116. The oil conduit 116 leads to ports 118d, 118f and 118g of the line pressure regulator valve 102 where the oil is regulated to generate a pressure oil under line pressure. This pressure oil is hereinafter referred to as a line pressure. The oil conduit 116 communicates with a port 120b of the manual valve 104 and a port 122c of the shift control valve 106.

The manual valve 104 has a valve bore 120 with five ports 120a, 120b, 120c, 120d and 120e, and a spool 124 having thereon two lands 124a and 124b slidably disposed in the valve bore 120. The spool 124 is actuated manually by a shift lever (not shown) between five detent positions or shift positions for P range, R range, N range, D range and L range. The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive the line pressure therein. When the spool 124 is set in P range, the port 120b supplied with the line pressure is covered by a land 124b, so that the cylinder chamber 58a of the reverse drive multiple disc clutch 58 and the cylinder chamber 48a of the forward drive multiple disc clutch 48 are drained via the oil conduit 126 and ports 120d and 120e. When the spool 124 is set in R range, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in N range, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is set in P range. When the spool 124 is set in D range or L range, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in P range or N range, both the forward drive multiple disc clutch 48 and the reverse drive multiple disc clutch 58 are released to interrupt the transmission of power, thus preventing the rotation of output shatfs 72 and 74. When the spool 124 is set in R range, the reverse drive multiple disc clutch 58 is engaged so as to drive the axle shafts 72 and 74 in the reverse rotational direction. When the spool 124 is set in D range or L range, the forward drive multiple disc clutch 48 is engaged so as to drive the axle shafts 72 and 74 in the forward rotational direction. Although there occurs no difference in the respect of a hydraulic circuit between the case where D range is selected and the case where L range is selected as mentioned above, both of the ranges are electrically detected to actuate the shift motor 110 in such a manner as to effect a shift control in accordance with different shift patterns.

The line pressure regulator valve 102 comprises a valve bore 118 with eight ports 118a, 118b, 118c, 118d, 118e, 118f, 118g and 118h; a spool 132 having thereon four lands 132a, 132b, 132c, and 132d, and a spring 133c disposed on the lefthand side of the spool 132; and a spring seat 134 fixed relative to the valve bore 118 by a pin 135. It is to be noted that the land 132d on the righthand end of the spool 132 is smaller in diameter than the middle lands 132a, 132b and 132c. A vacuum diaphragm 143 is arranged on the inlet of the bore 118. The vacuum diaphragm 143 is constructed of two parts 136a and 136b which clamp therebetween a diaphragm 137 and cooperate with each other to form a casing 136. The casing 136 is divided by the diaphragm 137 into two chambers 139a and 139b. Attached by a fixer 137a to the diaphragm 137 is a spring seat 137b with which a spring 140 is disposed in the chamber 139a biasing the diaphragm 137 to the right. The intake manifold vacuum is introduced into the chamber 139a via a port 142, while the other chamber 139b is vented to the atmosphere via a port 138. Arranged between the diaphragm 137 of the vacuum diaphragm 143 and the spool 132 is a rod 141 extending through the spring seat 134 so as to apply a rightwardly directed bias force to the spool 132. The arrangement is such that this bias force increases as the intake manifold vacuum decreases or becomes small. That is, if the intake manifold vacuum is small (i.e., if the intake manifold vacuum is near the atmospheric pressure), a large rightwardly directed force by the spring 140 is applied to the spool 132 through the rod 141 since a difference in pressure between the chambers 139a and 139b is small and thus the leftwardly directed force caused by this pressure difference and applied to the diaphragm 137 is small. In the reverse case where the intake manifold vacuum is large, the force applied to the spool 132 becomes small since the leftwardly directed force caused by the pressure difference between the chambers 139a and 139b becomes large and thus the rightwardly directed force by the spring 140 decreases correspondingly. The ports 118d, 118f and 118g of the line pressure regulator valve 102 are supplied with the oil under pressure from the oil pump 80, and the inlet to the port 118g is provided with an orifice 149. The ports 118a, 118c and 118h are at all times drained, and the port 118e is connected by an oil conduit 144 with the torque converter inlet port 146 and also with the ports 150c and 150d of the lock-up valve 108, and the port 118b is connected by an oil conduit 148 with the port 150b of the lock-up valve 108 and also with the lock-up clutch oil chamber 14. For preventing the application of an excessive pressure to the interior of the torque converter 12, the oil conduit 144 is provided with an orifice 145. Consequently, three forces act on the spool 132 in the rightward direction, i.e., one by the spring 133, another by the vacuum diaphragm 143 via the rod 141 and the other by the oil pressure applied to the left end of the land 132a via the port 118b. One force acts on the spool 132 in the leftward direction by the line pressure at the port 118g acting on differential area between the lands 132c and 132d. The spool 132 effects pressure regulation to provide the line pressure at the port 118d by adjusting the amount of drainage oil passing from the ports 118f and 118d to the respective ports 118e and 118c (i.e., first of all the oil is drained from the port 118f to the port 118e and, if more drainage is demanded, the oil is drained from the port 118d to the port 118c) until the rightwardly directed forces balance with the leftwardly directed force. As a result, the line pressure increases as the engine intake manifold vacuum drops and it increases as the oil pressure building up in the port 118b (i.e., the same pressure as in the lock-up clutch oil chamber 14) increases. Because the oil (in this case pressure exists in the oil chamber 14, the torque converter 12 is in a non lock-up state and serves as a torque multiplier. The variation in the line pressure in this manner meets the actual demands, i.e., the line pressure must be increased to increase a bracing force with which each of the pulleys 24 and 34 are biased against the V-belt 32 in response to an increase in the torque to be transmitted via the pulleys which increases as the engine load increases, i.e., as the intake manifold vacuum decreases, and besides the line pressure must be increased to increase the torque to be transmitted via the pulley as the multiplication of torque by the torque converter 12 increases.

The shift control valve 106 has a valve bore 122 with five ports 122a, 122b, 122c, 122d and 122e, and a spool 152 slidably disposed in the valve bore 122 and having thereon four lands 152a, 152b, 152c and 152d. The center port 122c communicates with the oil conduit 116 and is supplied with the line pressure, the left port 122b and the right port 122d communicate via respective conduits 154 and 156 with the drive pulley cylinder chamber 28 of the drive pulley 24 and the driven pulley cylinder chamber 44 of the driven pulley 34. Both of the end ports 122a and 122e are drained. The left end of the spool 152 is linked to a substantially middle portion of a lever 160 of the later-mentioned shift operating mechanism 112. The width of each of the lands 152b and 152c is set slightly shorter than the width of the respective ports 122b and 122d, and the distance between the lands 152b and 152c is set substantially the same as that between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. If the spool 152 is urged to move rightwardly, the reverse action to that mentioned above proceeds to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotatioal direction to cause the sleeve 162 to move leftwardly, the lever 160 moves in a clockwise rotational direction with its end portion received by the annular groove 30a of the axially movable conical disc 30 of the drive pulley 24 as an fulcurum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a decrease in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and driven pulley 34 to assume the state accomplishing a large reduction ratio. This action causes the spool 152 and the drive pulley 24 and driven pulley 34 to assume a state accomplishing a reduction ratio depending upon the amount of rotation of the shift motor 110. It goes the same if the shift motor 110 is rotated in the reverse direction. Therefore, if the shift motor 110 is actuated in accordance with a predetermined shift pattern, the reduction ratio varies accordingly, thus making it possible to control the reduction ratio in the continuously variable transmission by controlling the shift motor 110, alone.

The shift motor 110 is controlled by a control unit 300 which is described later in more detail in connection with FIG. 4.

The lock-up valve 108 comprises a valve bore 150 formed with four ports 150a, 150b, 150c and 150d, a spool 170 having two lands 170a and 170b, a spring 172 biasing the spool 170 rightwardly, and a lock-up solenoid 200 provided in the oil conduit communicating with the port 150d. The port 150a is drained. The port 150b communicates via an oil conduit 148 with the port 118b of the line pressure regulator valve 102 and also with the lock-up clutch oil chamber 14 within the torque converter 12. The ports 150c and 150d are connected with each other via an orifice 201. A branch oil conduit 207 is formed between the port 150d and the orifice 201. The branch oil conduit 207 opens via an orifice 203 and has its outlet to be closed or opened by the lock-up solenoid 200 in response to on state thereof or off state thereof. The size of the orifice 203 is greater than that of the orifice 201. When the lock-up solenoid 200 is in the on state, the spool 170 is pressed against the force of the spring 172 toward the left because the same oil pressure as that supplied to the torque converter inlet port 146 is supplied to the port 150d from the oil conduit 144 as a result of closing of the outlet of the branch oil conduit 207. In this state, the port 150c is blocked by the land 170b and the port 150b is allowed to drain toward the port 150a. As a result, the lock-up clutch oil chamber 14 which has been connected with the oil pressure via the port 150b and the oil conduit 148 is drained, allowing the lock-up clutch 10 to be engaged under the influence of the pressure in the torque converter 12, thus putting the torque converter 12 into lock-up state where the torque converter does not serve as a torque converter. In the reverse case when the lock-up solenoid 200 is put into the off state, the spool 170 is moved in the rightward direction by the rightwardly directed force by the spring 172 and the port 150b is allowed to communicate with the port 150c since the oil pressure at the port 150d drops due to uncovering of the outlet of the branch oil conduit 207 (the portion of the oil conduit 144 which is subjected to this drop in pressure is confined to a portion between the orifice 201 and the port 150d leaving the remainder of the oil conduit 144 unaffected to this pressure drop owing to the provision of the orifice 201) and this causes the force biasing the spool 170 to the left to disappear. As a result, the oil conduit 148 is allowed to communicate with the oil conduit 144, applying the same oil pressure as that applied to the torque converter inlet port 146 to the lock-up clutch oil chamber 14, causing the pressures on the both sides of the lock-up clutch 10 to become equal to each other, resulting in the release of the lock-up clutch 10. An orifice 174 is provided in the inlet of the port 150c and another orifice 178 is provided in the drain oil conduit connected with the port 150a. The orifice 178 is provided to prevent rapid drainage of the oil pressure from the lock-up clutch oil chamber 14 so as to alleviate a shock upon shifting into the lock-up state, whereas, the orifice 174 is provided in the oil conduit 144 to permit a gradual increase in oil pressure within the lock-up oil chamber 14 so as to alleviate a shock upon release from the lock-up state.

The torque converter outlet port 180 communicates with the oil conduit 182 which is provided with a relief valve 188 including a ball 184 and a spring 186 and thus, with this relief valve, the pressure within the torque converter 12 is maintained within normal operating pressure range. The oil downstream of the relief valve 188 is introduced by an oil conduit 190 to an oil cooler and a lubricant circuit, both being unillustrated, and is finally drained, whereas, an excessive oil is drained by another relief valve 192, the thus drained oil being returned finally to a tank 114.

Next, an explanation is made regarding the control unit 300 which controls the shift motor 110 and the lock-up solenoid 200. The shift motor 110 is a stepper motor and thus referred hereinafter to as the stepper motor.

As shown in FIG. 4, the control unit 300 receives input signals from an engine revolution speed sensor 301, a vehicle speed sensor 302, a throttle opening degree sensor 303, a shift position switch 304, a shift reference switch 240, an engine coolant temperature sensor 306, and a brake sensor 307. The engine revolution speed sensor 301 detects an engine revolution speed by measuring the number of ignition spark pluses of the engine per unit time, and the vehicle speed sensor 302 detects a vehicle speed by measuring the revolution of the output shaft of the continuously variable transmission. The throttle opening degree sensor 303 detects the engine load by measuring the engine throttle opening degree, and generates an electric voltage signal. The throttle opening degree sensor 303 may be replaced with an intake manifold vacuum sensor or a fuel flow rate sensor. The shift position switch 304 detects which one of the range positions, namely, P range, N range, D range, and L range, is selected by the manual valve 104. The shift reference switch 240 is turned on when the sleeve 162 of the shift operating mechanism 112 assumes a position corresponding to the largest reduction ratio.

For this purpose, the shift reference switch 240 is disposed such that it is turned on when the sleeve 162 is moved to the rightward limit position viewing in FIG. 3. The engine coolant temperature sensor 306 generates a signal when the engine coolant temperature is lower than a predetermined value. The brake sensor 307 detects whether or not the vehicle brake is actuated. The sensor output signals generated by the engine revolution speed sensor 301 and vehicle speed sensor 302 are sent to an input interface 311 after passage through wave shapers 308 and 309, respectively. The electric voltage from the throttle opening degree sensor 303 is converted by an analog-digital (A/D) converter 310 into a digital signal before being sent to the input interface 311. In addition to the input interface the shift control unit 300 comprises a reference pulse generator 312, a CPU (Central Processor Unit) 313, a ROM (Read Only Memory) 314, a RAM (Random Access Memory) 315, and an output interface 316, which are linked with each other by an address bus 319 and a data bus 320. The reference pulse generator 312 generates reference pulses with which the CPU 313 is actuated. The ROM 314 stores programs necessary for controlling the stepper motor 110 and lock-up solenoid 200 and data necessary for controlling them. The RAM stores various parameters necessary for processing information from each of the sensors and switches and parameters necessary for controlling the stepper motor 110 and lock-up solenoid 200. Output signals from the control unit 300 are sent to the stepper motor 110 and lock-up solenoid 200 via respective amplifiers 317 and 318.

Hereinafter, a concrete explanation is made regarding a control method carried out by this control unit 300 in controlling the stepper motor 110 and lock-up solenoid 200.

The control may be divided into two routines, one being a lock-up solenoid control routine 500, the other being a stepper motor control routine 700.

Figure 5A:
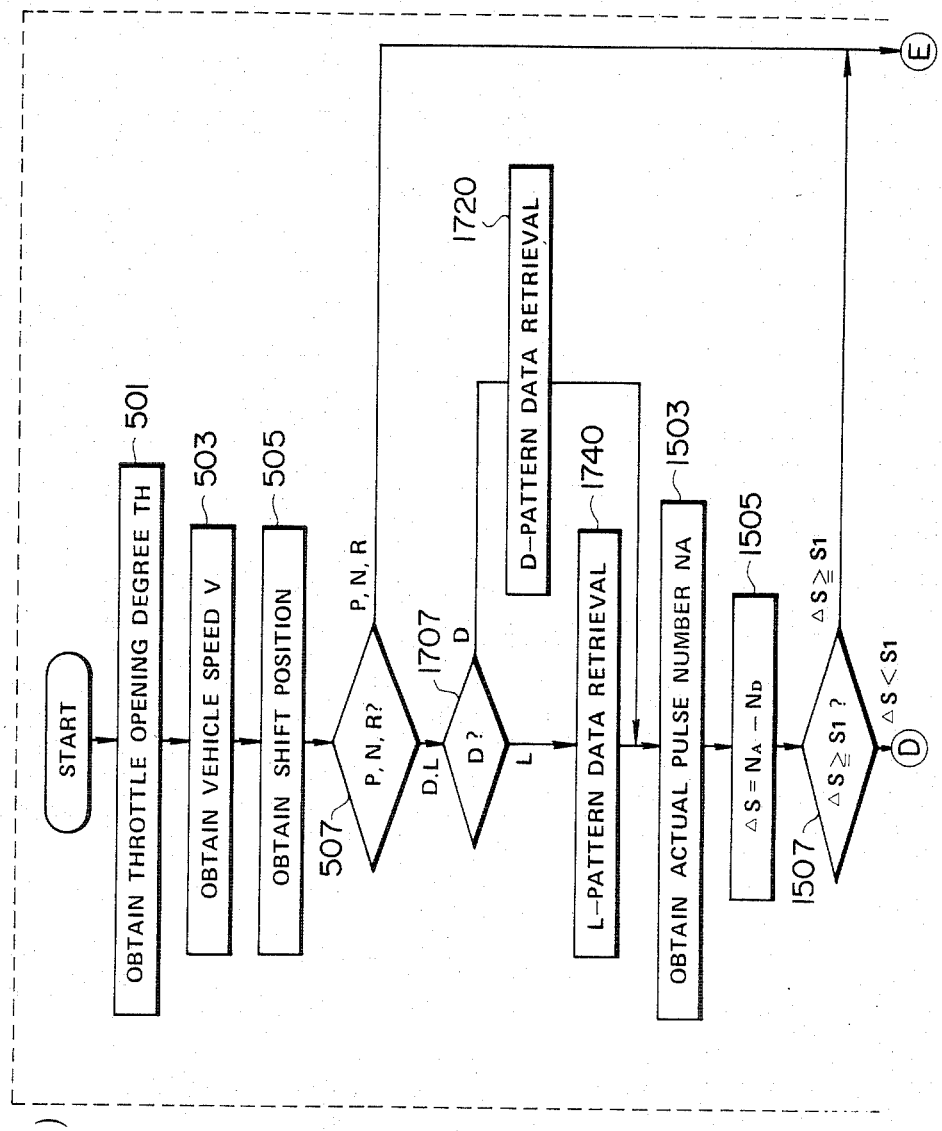
FIGS. 5(a) and 5(b) illustrate a flow chart of a lock-up solenoid control routine.
Figure 5B:
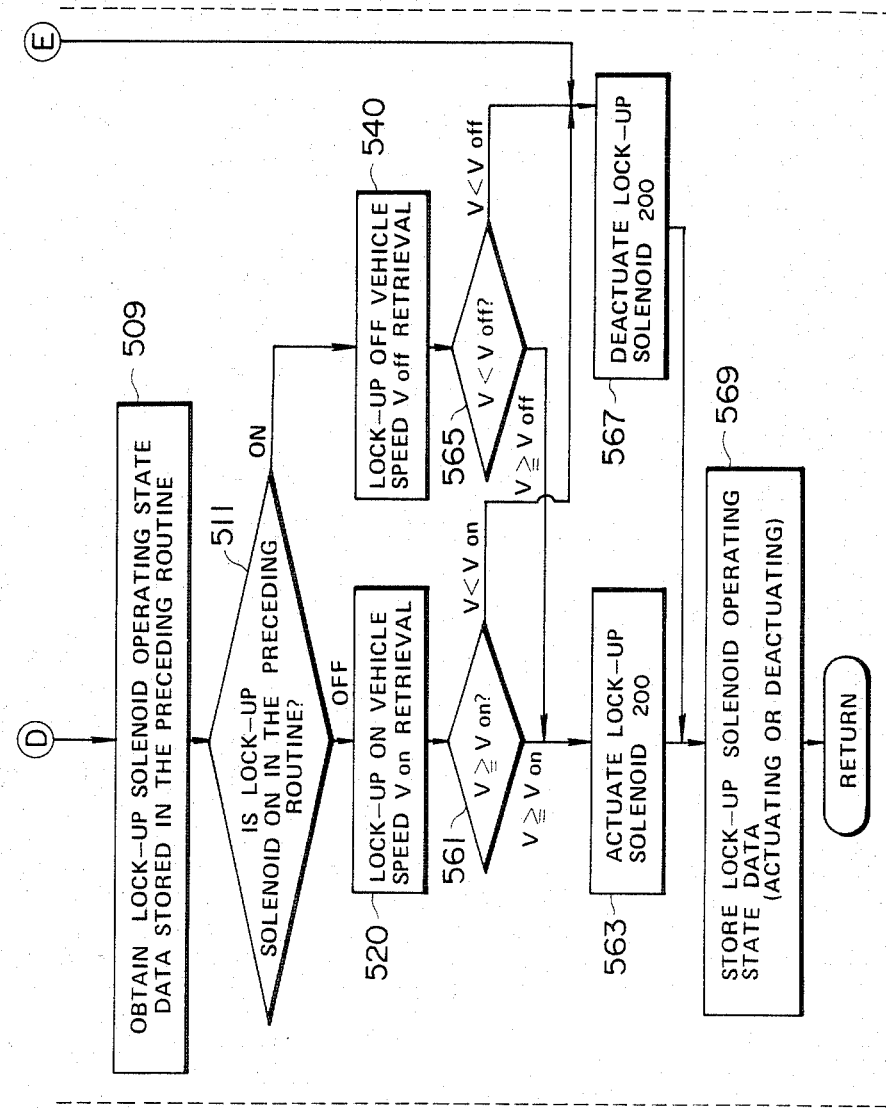
Figure 6:
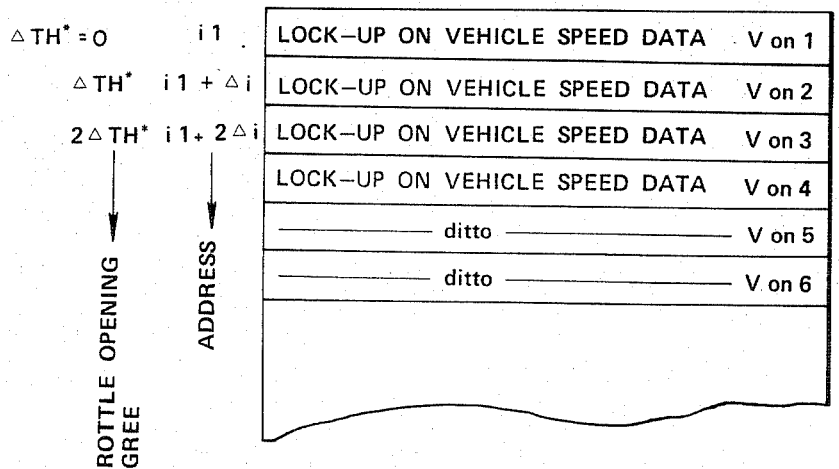
FIG. 6 is a diagrammatic view illustrating how lock-up on vehicle speed data are stored in a ROM 314 shown in FIG. 4.
Figure 10:
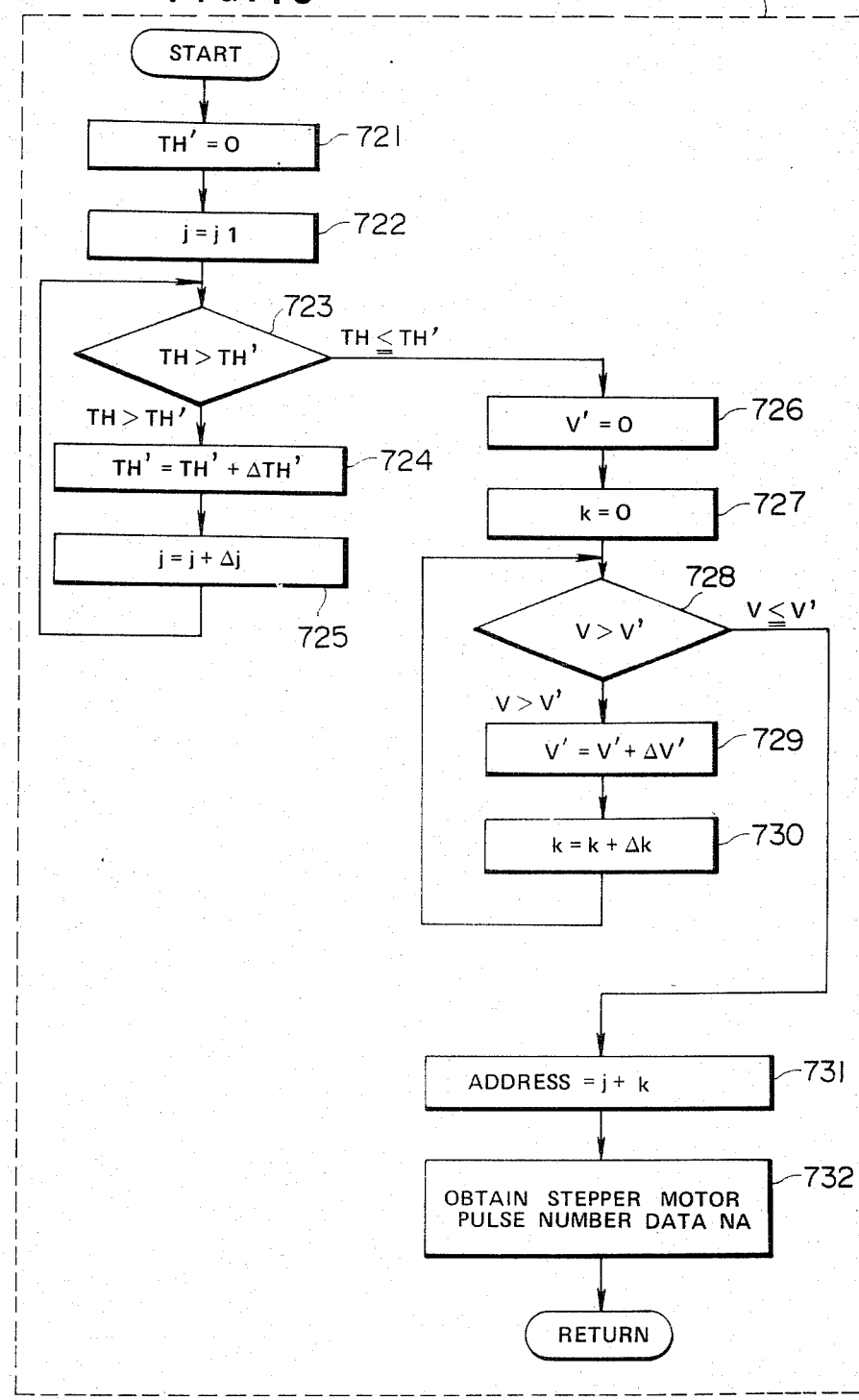
FIG. 10 is a flow chart showing a D range pattern data retrieval routine.

First of all, the control of the lock-up solenoid 200 is explained. The lock-up solenoid control routine 500 is shown in FIGS. 5(a) and 5(b). The lock-up solenoid control routine 500 is executed once per a predetermined period of time. Thus, the execution of the following routine is repeated after a short period of time. A throttle opening degree signal TH indicative of the engine load is obtained from the throttle opening degree sensor 303 in step 501, then a vehicle speed indicative signal V is obtained from the vehicle speed sensor 302 in step 503 and after that a shift position indicative signal is obtained from the shift position switch 304 in step 505. A determination is made in step 507 whether any one of the P range, N range and R range is selected, and if the determination result reveals that the P range or N range or R range is selected, the lock-up solenoid 200 is deactuated (off state) in step 567 and then, in step 569, the present state of the lock-up solenoid 200 is stored in terms of a lock-up solenoid operating state data in the RAM 315 before the program returns to START of the routine 500. It will now be understood that as long as the P range or N range or R range is selected, the lock-up solenoid 200 is not energized and thus the torque converter 12 is in the non lock-up state. If the determination made in the step 507 shows that none of P, N nor R range position is selected, a determination is made whether D range is selected or not in step 1707. If the D range is selected, a D range shift pattern retrieval routine is executed in step 1720. The D range shift pattern retrieval routine 1720 provides a pulse number ND for the stepper motor which corresponds to the present throttle opening degree TH and vehicle speed V, but since it is quite the same as a later described D range shift pattern retrieval routine 720 (FIG. 10), the detailed description thereof is not made here. If, in the step 1707, the D range is not selected, a L range shift pattern retrieval routine is executed in step 1740. The L range shift pattern retrieval routine 1740 is basically the same as the D range shift pattern retrieval routine 1720 but the data stored therein are different pulse numbers (this difference being described later). After retrieving a desired pulse number ND for the stepper motor in step 1720 or 1740 (although the pulse number data retrieved in step 1740 is NL, it is also represented by ND in the following description), the program goes to a step 1503 wherein an actual pulse number NA is obtained which represents the present position of the stepper motor. Then, a difference ΔS between the actual pulse number NA and the desired pulse number ND is computed by subtracting ND from NA in step 1505 and a determination is made whether ΔS is greater than or equal to a predetermined positive value S1 or not in step 1507. If the difference ΔS is greater than or equal to S1 (i.e., a state wherein a rapid increase in reduction ratio is needed because the actual pulse number NA is considerably greater than the desired pulse number ND), the program goes to a step 567 to deactuate the lock-up solenoid 200. As a result, the engagement of the lock-up clutch is released. If the difference ΔS is less than S1, the lock-up solenoid operating state data (whether being actuated or not actuated) in the preceding routine is obtained from the corresponding address in the RAM 315 in step 509. Then, a determination is made in step 511 whether the lock-up solenoid 200 was actuated (in the on state) or not in the preceding routine. If in the preceding routine the lock-up solenoid 200 was not actuated or was in the off state, the data are retrieved in step 520 relating to a vehicle speed value (a lock-up on vehicle speed value Von) above which the lock-up solenoid 200 is to be actuated. The data retrieval routine 520 is described in connection with FIGS. 6, 7 and 8. Lock-up on vehicle speed data Von, such as, Von1-~Von6, are stored in the ROM 314 for the throttle opening degrees as shown in FIG. 6. Referring to FIG. 7, in the data retrieval routine 520, a reference throttle opening degree TH* is given a zero value in step 521 which corresponds to idle state and then an address i for the ROM 314 is given a number i1 corresponding to the number zero of the reference throttle opening degree TH* (in step 522). Then, the actual throttle opening degree TH is compared with the reference throttle opening degree TH* (in step 523). If the actual throttle opening degree TH is smaller than or equal to the reference throttle opening degree TH*, the number i1 gives an address in the ROM 314 where an optimum lock-up on vehicle speed data Von corresponding to the actual throttle opening degree TH is stored and the lock-up on vehicle speed data Von is obtained from the address given by the number i1 (in step 526). On the other hand, if the actual throttle opening degree TH is greater than the reference throttle opening degree TH* in the step 523, the reference throttle opening degree TH* is increased by a predetermined amount ΔTH* (in step 524) and address i is increased by a predetermined amount Δi (in step 525). Thereafter, the program returns to the step 523 again where the actual throttle opening degree TH is compared with the reference throttle opening degree TH*. By repeating this chain of steps (steps 523, 524 and 525), the number of the address i in the ROM 314 is given where a lock-up on vehicle speed data Von corresponding to the actual throttle opening degree TH is stored. Then, the lock-up on vehicle speed data Von is obtained from the address i.

Referring again to FIGS. 5(a) and 5(b), after the completion of the data retrieval routine 520 the lock-up on vehicle speed data Von is compared with the actual vehicle speed V (in step 561) and if the actual vehicle speed V is higher than or equal to the lock-up on vehicle speed Von, then the lock-up solenoid 200 is actuated (in step 563), whereas if the relationship is reversed the lock-up solenoid 200 is not actuated (in step 567), and then operating state data indicating actuating state or deactuating state is stored in the RAM 315 (in step 569).

If, in the step 511, the lock-up solenoid 200 was found to be actuated in the preceding routine, a retrieval routine for vehicle speed data Voff (a lock-up off vehicle speed) below which the lock-up is to be released is executed (in step 540). This data retrieval routine 540 is substantially the same in operation as the data retrieval routine 520 for lock-up on vehicle speed data Von (only difference being in the stored data as follows) and therefore the explanation thereof is omitted.

Figure 8:
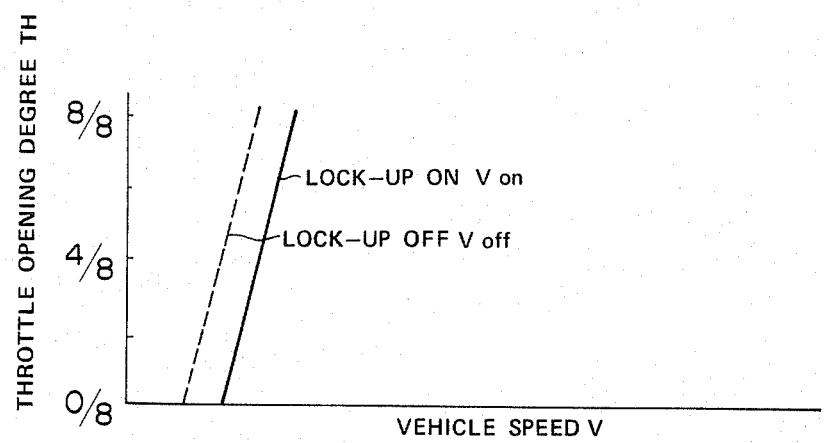
FIG. 8 is a graph showing the relationship between lock-up vehicle speed Von and lock-up off vehicle speed Voff.

The lock-up on vehicle speed data Von and the lock-up off vehicle speed data Voff have the relationship as shown in FIG. 8. The relationship Von>Voff provides a hysterisis. This prevents the occurrence of hunting of the lock-up solenoid 200.

After the completion of the step 540, the lock-up off vehicle speed data Voff which has been retrieved in the step 540 is compared with the actual vehicle speed V in step 565, and if the vehicle speed V is higher than or equal to the lock-up off vehicle speed Voff, the lock-up solenoid 200 is actuated in step 563. If V is lower than Voff, the lock-up solenoid 200 is deactuated in step 567. Then the lock-up solenoid operating state indicative data is stored in the RAM 315 before the program returns to START.

As will now be understood from the above description that, if the D or L range is selected, the torque converter 12 is rendered to operate in the lock-up state when the vehicle speed is higher than the lock-up on vehicle speed, whereas it is rendered to operate in the non-lock state when the vehicle speed is lower than the lock-up off vehicle speed Voff, and the non lock-up state is maintained irrespective of the actual vehicle speed whenever a rapid down shifting is needed. This means that whenever a rapid down shifting is needed (i.e., a state wherein a rapid acceleration is needed) at a vehicle speed higher than the lock-up off vehicle speed Voff, the torque converter is rendered to operate in the non lock-up state, thus providing a strong and rapid acceleration owing to the torque converter function thereof, thus improving a response of the continuously variable V-belt transmission to shifting demand.

Hereinafter, the stepper motor control routine 700 for the stepper motor 110 will be explained in connection with FIGS. 9(a) and 9(b). The stepper motor control routine 700 is executed once per a predetermined period of time. Thus, the execution of the following routine is repeated after a short period of time. First, the solenoid operating state data which was stored in the step 569 (see FIG. 5) of the lock-up solenoid control routine 500 is obtained in step 698 (see FIG. 9(a)), and a determination is made of the lock-up state in step 699. If the lock-up solenoid 200 was actuated, the execution of a routine beginning with a step 701 starts, whereas if the lock-up solenoid 200 was not actuated, the execution of a chain of steps beginning with step 713 (see FIG. 9(b)) starts. In the latter case the control is made, in a manner described later, such that the largest reduction ratio is maintained. That is, the largest reduction ratio is maintained during operation with the torque converter 12 in the non lock-up state.

If, in step 699, the lock-up solenoid 200 is actuated, the throttle opening degree TH is obtained from the throttle opening degree sensor 303 in step 701, then the vehicle speed V is obtained from the vehicle speed sensor 302 in step 703, and after that the shift position is obtained from the shift position switch 304 (in step 705). Subsequently, a determination is made whether the present shift position is the D range in step 707. If the present shift position is the D range, a D range shift pattern data retrieval routine is executed in step 720.

The D range shift pattern data retrieval routine in step 720 provides a desired optimum reduction ratio indicative signal. The desired reduction ratio indicative signal represents a desired optimum reduction ratio for the detected operating condition of the automotive vehicle and is expressed in terms of a number of pulses ND which is hereinafter called as a stepper motor pulse number. The D range shift pattern data retrieval routine is executed in a manner illustrated in FIG. 10. The stepper motor pulse number data ND are stored in the ROM 314 in a matrix shown in FIG. 11. The vehicle speed values are arranged along the lateral axis and the throttle opening degree values are arranged along the vertical axis (the vehicle speed increases toward the right in FIG. 11 and the throttle opening degree increases toward the bottom in FIG. 11). Referring to the D range shift pattern data retrieval routine 720 shown in FIG. 10, a reference throttle opening degree TH' is given a zero value which corresponds to idle state in step 721 and an address j of the ROM 314 where a stepper motor pulse number data which corresponds to zero throttle opening degree is given a number j' in step 722. Subsequently, the actual throttle opening degree TH is compared with the reference throttle opening degree TH' in step 723. If the actual throttle opening degree TH is greater than TH', the reference throttle opening degree TH' is increased by $\Delta$TH' in step 724 and the address j is increased by a predetermined amount $\Delta$j in step 725. After this step, the actual throttle opening degree TH is compared with the reference throttle opening degree TH' again (in step 723), and if the actual throttle opening degree TH stays greater than TH', the steps 724, 725 and 723 are repeated. After the execution of the steps 723, 724 and 725 has been repeated, the number j corresponding to the actual throttle opening degree TH is given when the actual throttle opening degree TH becomes equal or smaller than the reference throttle opening degree TH'. Subsequently, steps 726, 727, 728, 729 and 730 are executed in relation to vehicle speed V. As a result, the number k is given which corresponds to the actual vehicle speed V. Then, the number k thus given is combined with the number j in step 731, thus producing an address corresponding to a set of the actual throttle opening degree TH and the actual vehicle speed V, and the stepper motor pulse number data ND is obtained from this address in step 732. The pulse number data ND thus obtained shows a desired stepper motor pulse number to be given for the actual throttle opening degree TH and the actual vehicle speed V. The D range shift pattern data retrieval routine 720 ends with the step of retrieving the pulse number data ND before the program returns to START.

Figure 9:
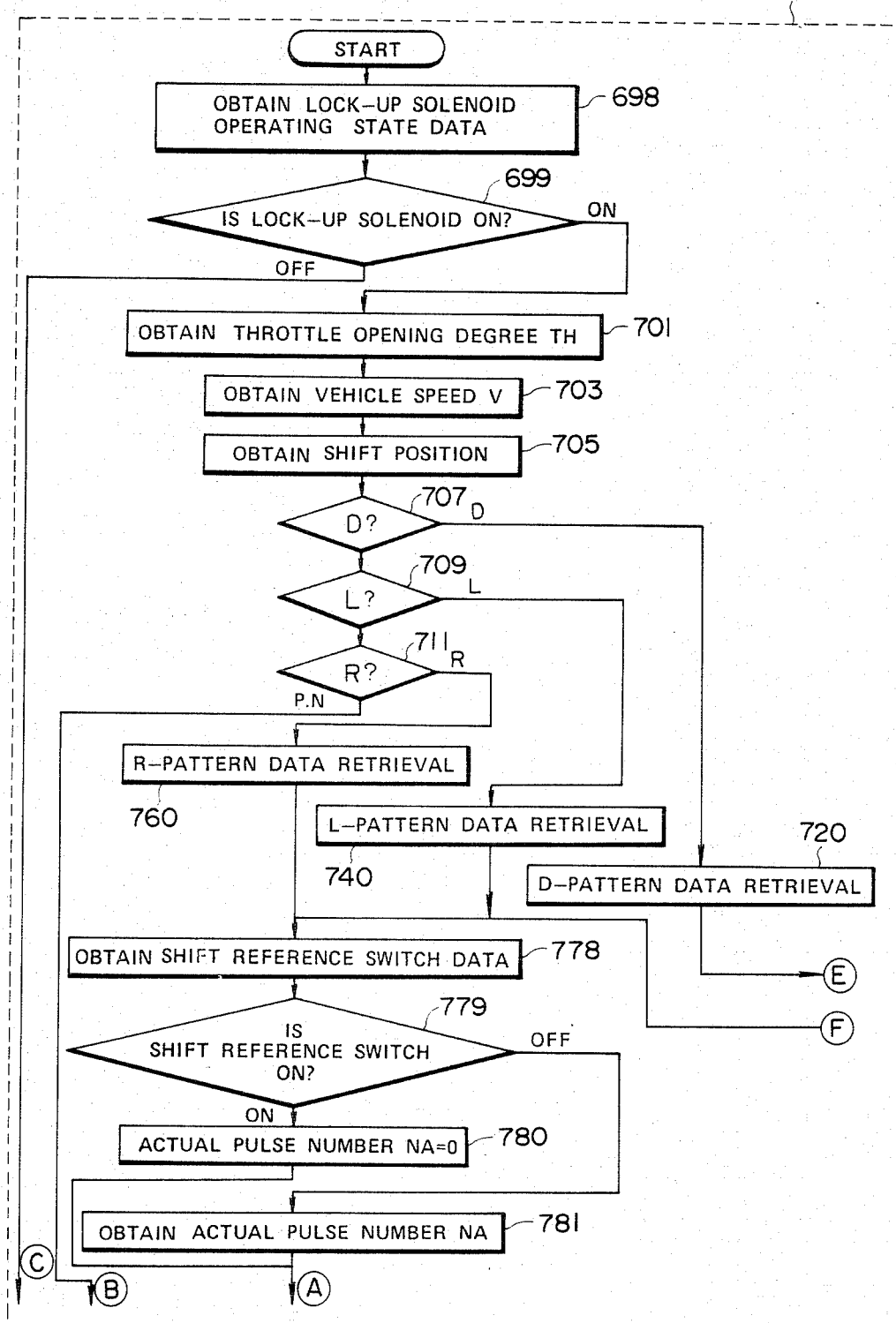
FIGS. 9(a) and 9(b) illustrate a flow chart showing a stepper motor control routine.

Referring to FIG. 9(a), if the D range is not selected as the result of the determination in the step 707, then a determination is made whether the L range is selected in step 709, and if the L range is selected, a L range shift pattern data retrieval routine is executed (in step 740). The L range shift pattern data retrieval routine is substantially similar to the D range shift pattern data retrieval routine 720 except that the stepper motor pulse number data NL are different from the stepper motor pulse number data ND (the difference between the pulse number data ND and NL will be described hereinafter) and are stored at different addresses in the ROM 314. A detailed explanation thereof is, therefore, omitted.

If neither the D range nor the L range is selected, a determination is made whether the R range is selected in step 711. If the R range is selected, a R range shift pattern data retrieval routine 760 is executed in step 760. The R range shift pattern data retrieval routine 760 is substantially similar to the D range shift pattern data retrieval routine 720 except that different stepper motor pulse number data NR are stored and thus a detailed explanation thereof is omitted.

After the data retrieval of the suitable pulse number data ND, NL or NR in the respective step 720, 740 or 760, a shift reference switch data is obtained from the shift reference switch 240 in step 778 and then a determination is made whether the shift reference switch 240 is in the on-state or the off-state in step 779. The shift reference switch data indicates whether the shift reference switch 240 is turned on or off. If the shift reference switch 240 is in the off state, the actual stepper motor pulse number data NA is retrieved from the RAM 315 in step 781. This pulse number data NA corresponds one to one to the actual rotary position of the stepper motor 110 unless there is any electric noise. If, in the step 779, the shift reference switch 240 is in on state, the pulse number data NA is given a zero value in step 780. The shift reference switch 240 is so designed as to be turned on when the sleeve 162 assumes a position corresponding to the largest reduction ratio. This results in the rotary position of the stepper motor 110 always corresponding to the largest reduction ratio position whenever the shift reference switch 240 is turned on. Because the actual pulse number data NA is given a zero value whenever the shift reference switch 240 is turned on, the pulse number data NA can correspond accurately to the actual rotary position of the stepper motor 110 should there occurr a signal distortion due to electric noise. Consequently, the signal distortion due to the accumulation of noise is eliminated. Subsequently, in step 783 (see FIG. 9(b)), the actual pulse number data NA is compared with the retrieved desired pulse number data ND, NL or NR.

Figure 9B:
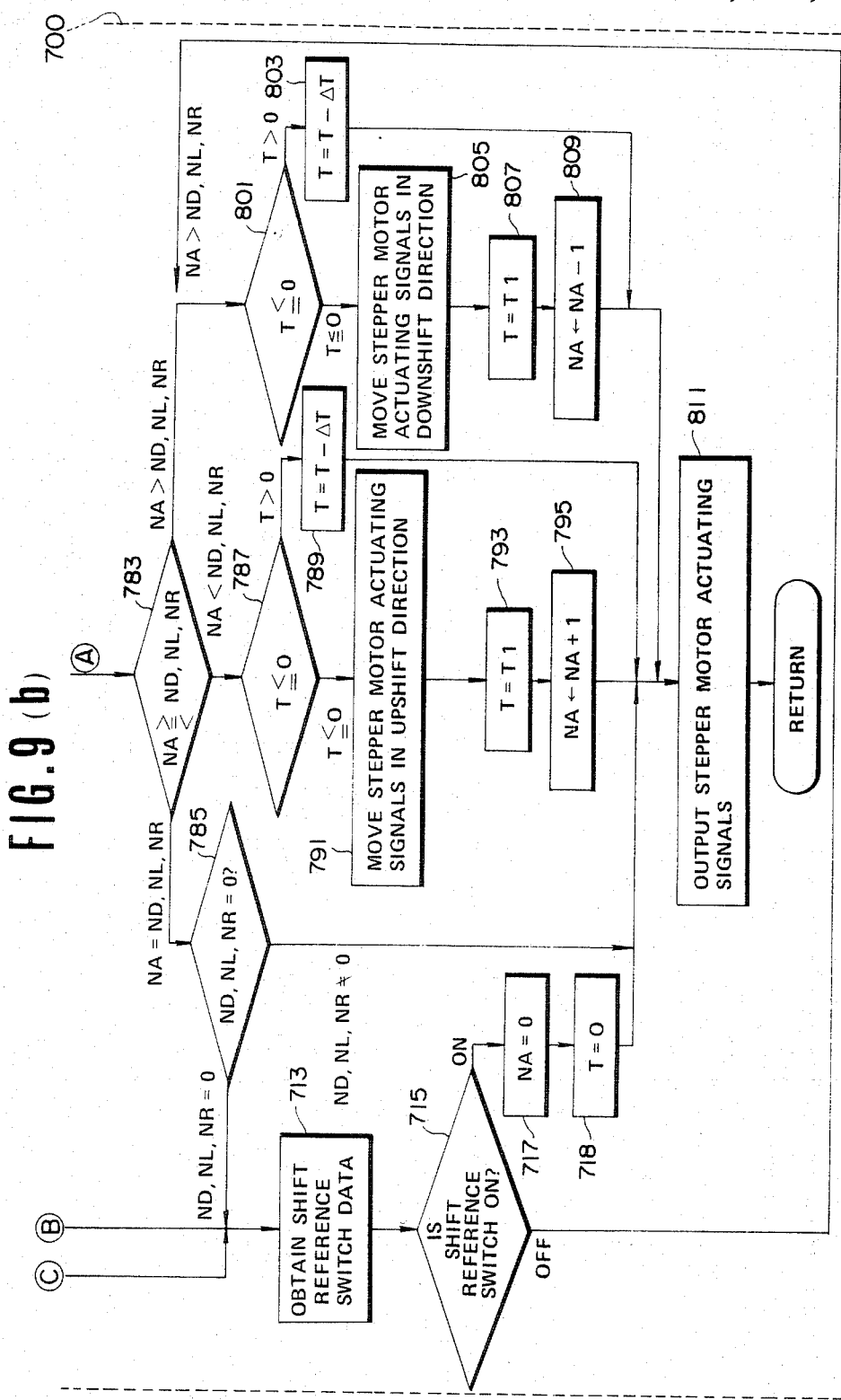

Referring to FIG. 9(b), if the actual pulse number data NA is equal to the desired pulse number data ND, NL or NR as the result of step 783, a determination is made whether the desired pulse number ND, NL or NR is zero in step 785. In the case the desired pulse number ND, NL or NR is not zero when the reduction ratio is not the largest, the same stepper motor actuating signals (described hereinafter) as provided for in the preceding routine are sent out in step 811 before the program returns to START. If the desired pulse number ND, NL or NR is zero in the step 785, the shift reference switch data is obtained from the shift reference switch 240 in step 713, and a determination is made whether the shift reference switch 240 is in the on state or the off state in step 715. If the shift reference switch 240 is in the on state, the actual pulse number data NA is given a zero value in step 717, a stepper motor timer value T which will be described later is given zero in step 718, and then the same stepper motor actuating signals as those of the preceding routine which correspond to the zero pulse number are sent out in step 811. If, in step 715, the shift reference switch 240 is in the off state, the execution of the steps following the step 801, which will be described later, begins.

If, in the step 783, the actual pulse number NA is smaller than the desired pulse number ND, NL or NR, the stepper motor 110 needs to be actuated toward where the pulse number increases. First, a determination is made whether the timer value T is negative inclusive zero in step 787. If the timer value T is positive, then the timer value T is decreased by a predetermined value $\Delta T$ in step 789, and then the same stepper motor actuating signals as those of the preceding routine are sent out in step 811 before the program returns to START. This step 789 is repeated until the timer value T becomes zero or negative. When the timer value T becomes zero or negative after elapse of a predetermined period of time, then the stepper motor actuating signals for the stepper motor 110 are moved in the upshift direction by one stage in step 791 as described later. Then, the timer value T is given a predetermined positive value T1 in step 793; the stepper motor pulse number NA is increased by 1 in step 795, and the stepper motor actuating signals which have been moved by one state in the upshift direction are sent out in step 811 before the program returns to START. This causes the stepper motor 110 to rotate toward the upshift direction by one unit.

If, in step 783, the present stepper motor pulse number NA is greater than the desired pulse number ND, NL or NR, a determination is made whether the timer value T is zero or negative in step 801. If the timer value T is positive, the timer value T is decreased by the predetermined value $\Delta T$ (in step 803), and the same stepper motor actuating signals as those of the preceding routine are sent out in step 811 before the program returns to START. After repeating this sequence of operations, the timer value T becomes zero or negative after elapse of a predetermined period of time because the decrement of the timer T by the predetermined value $\Delta T$ is repeated. When the timer value T becomes zero or negative, the stepper motor actuating signals are moved toward a downshift direction by one stage in step 805. Then the timer value T is given the predetermined positive value T1 in step 807; the stepper motor pulse number data NA is decreased by 1 in step 809, and the stepper motor actuating signals having been moved in the downshift direction are sent out (in step 811) before the program returns to START. This causes the stepper motor 110 to rotate in the downshift direction by one unit.

Figures 11, 12:
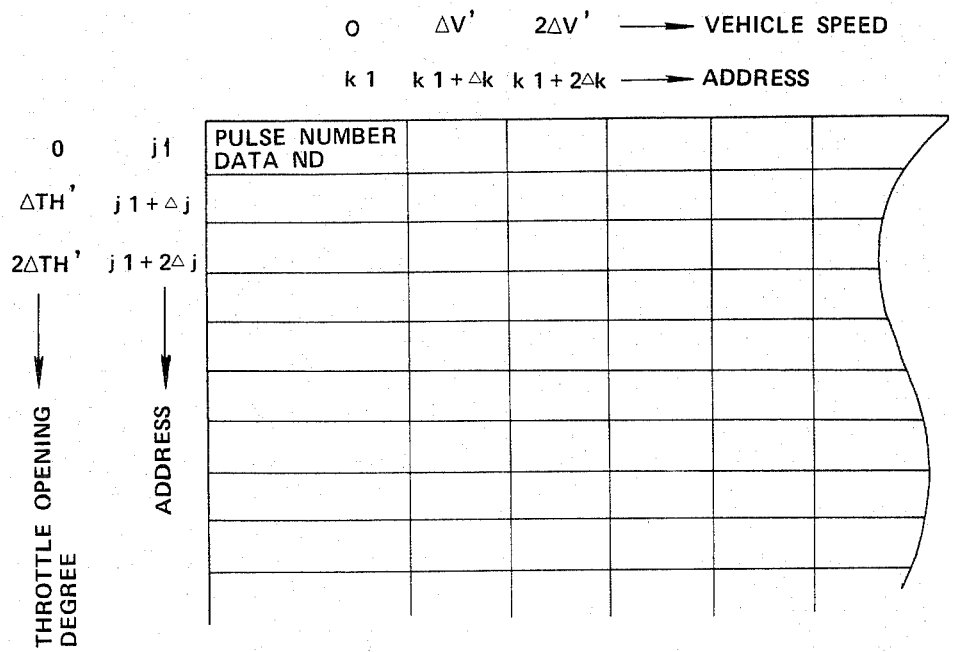
FIG. 11 is a diagrammatic view illustrating how pulse number data ND are stored in a matrix in the ROM 314 versus throttle opening degree and vehicle speed.
FIG. 12 is a chart illustrating various modes of stepper motor actuating signals applied to output leads 317a, 317c, 317b and 317d of the stepper motor 110.
Figure 13:
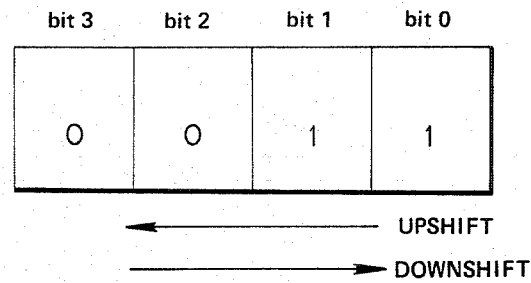
FIG. 13 is a diagrammatic view of the content of four bit positions corresponding to the mode A.
Figure 14:
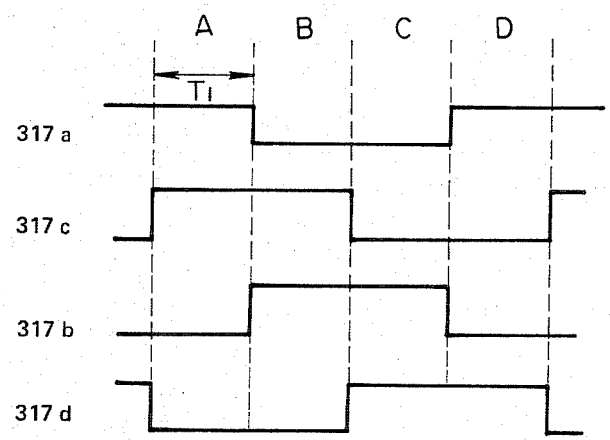
FIG. 14 is a timing diagram of the stepper motor actuating signals.

Referring to FIGS. 12 to 14 and particularly to FIGS. 13 and 14, the stepper motor actuating signals will now be described. The stepper motor 110 is connected with four output lead lines 317a, 317b, 317c, and 317d (see FIG. 4) having thereon respective signals which may vary in four modes A~D, and the stepper motor 110 rotates in the upshift direction (the direction denoted by an arrow X as shown in FIGS. 3 and 4) if the actuating signals are moved in the sequence of A→B→C→D→A, and the stepper motor 110 rotates in the reverse or downshift direction if the actuating signals are moved in the sequence of D→C→B→A→D. Referring to FIG. 13 which illustrates the content of the bits corresponding to the mode A of the actuating signals, the digit "1" is written in bit position 0, the digit "1" in bit position 1, the digit "0" in bit position 2, and the digit "0" in bit position 3. The bit positions 0, 1, 2, 3 correspond to the signals to be applied to the respective leads 317a, 317c, 317b and 317d. If the digit is "1" in a particular bit position, a signal voltage having a high level is applied to the lead operatively associated with the particular bit position. If the digit in a particular bit position is "0", a signal voltage having a low level is applied to the corresponding lead. Consequently, when the stepper motor 110 is to be rotated in the upshift direction, the bits are rotated to the right, i.e., the digits are moved one place to the left. When the stepper motor 110 is to be rotated one step in the downshift direction, the bits are rotated to the left, i.e., the digits are moved one place to the right.

The variation of the signals on the output lead lines 317a, 317c, 317b, and 317d upon upshifting is illustrated in FIG. 14. In FIG. 14, the period of time during which each of modes A, B, C and D stays constant, agrees with the timer value T1 which has been obtained in the step 793 or 807.

As described above, the stepper motor actuating signals are moved to the left or in the upshift direction in step 791 when the actual pulse number, i.e., the actual reduction ratio, is smaller than the desired pulse number, i.e., the desired optimum reduction ratio, thus serving as actuating signals for rotating the stepper motor 110 in the upshift direction. In the reverse case, when the actual reduction ratio is larger than the desired optimum reduction ratio, the stepper motor actuating signals are moved to the right or in the downshift direction in step 805, thus serving as actuating signals for rotating the stepper motor 110 in the downshift direction. When the actual reduction ratio agrees with the desired optimum reduction ratio, the actuating signals are not moved to the left nor right, and the same actuating signals as those of the preceding routine are sent out. In this case, the stepper motor 110 will not rotate, thus maintaining the reduction ratio constant.

If, in the previously described step 711 shown in FIG. 9(a), the R range is not selected, i.e., if the P range or N range is selected, the execution of the step 713 and its following steps begins. The shift reference switch data is obtained from the shift reference switch 240 in step 713 and if the shift reference switch 240 is in the on state, the actual pulse number NA is given a zero value in step 717 and the stepper motor timer value T is given a zero value in step 718. Then, the same actuating signals as those of the preceding routine are sent out in step 811 before the program returns to START. If the shift reference switch 240 is in the off state, the steps following the step 801 are executed which have been described. That is, the stepper motor 110 is rotated in the downshift direction. Accordingly, the largest reduction ratio is maintained when the shift position is in the P or N range.

Hereinafter, a description is made as to how the desired optimum reduction ratio is determined.

Referring to FIGS. 15-19, a description will now be given of how the desired optimum reduction ratio is determined to satisfy the minimum fuel consumption rate curve during operation in the D range.

Figure 15:
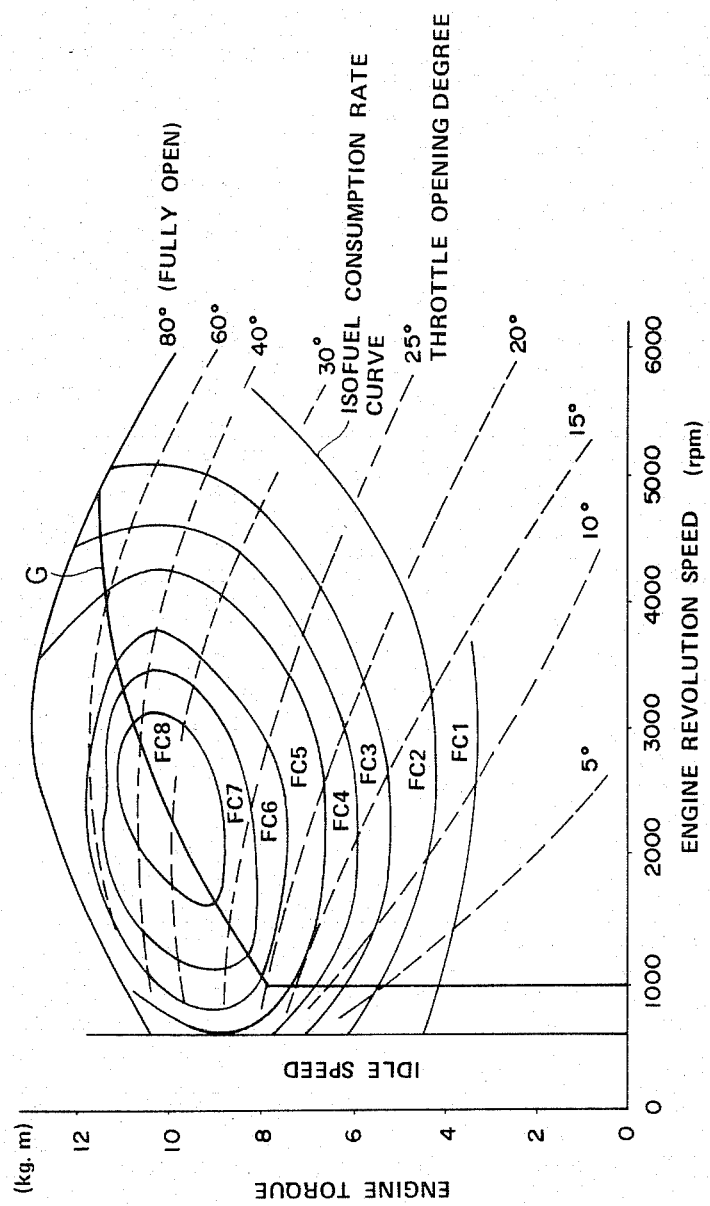
FIG. 15 is a graph showing a minimum fuel consumption rate curve G.
Figure 16:
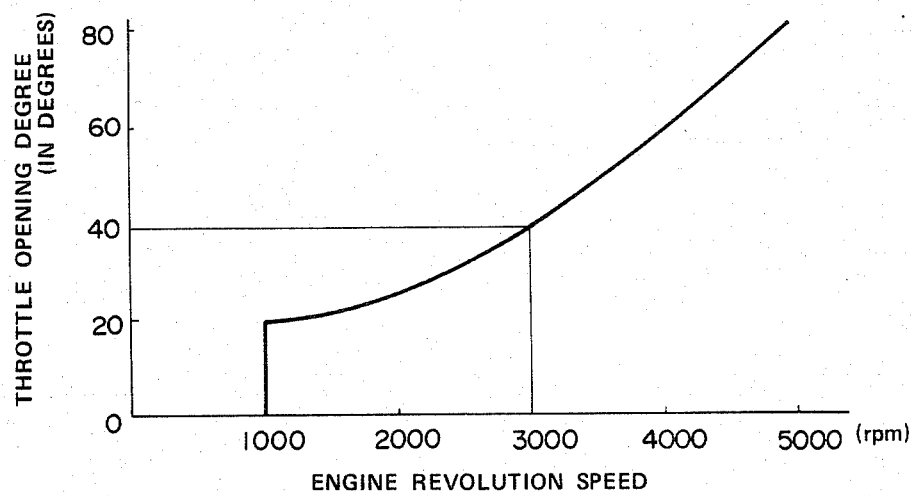
FIG. 16 is a graph showing the minimum fuel consumption rate curve expressed in terms of the throttle opening degree and engine revolution speed.
Figure 17:
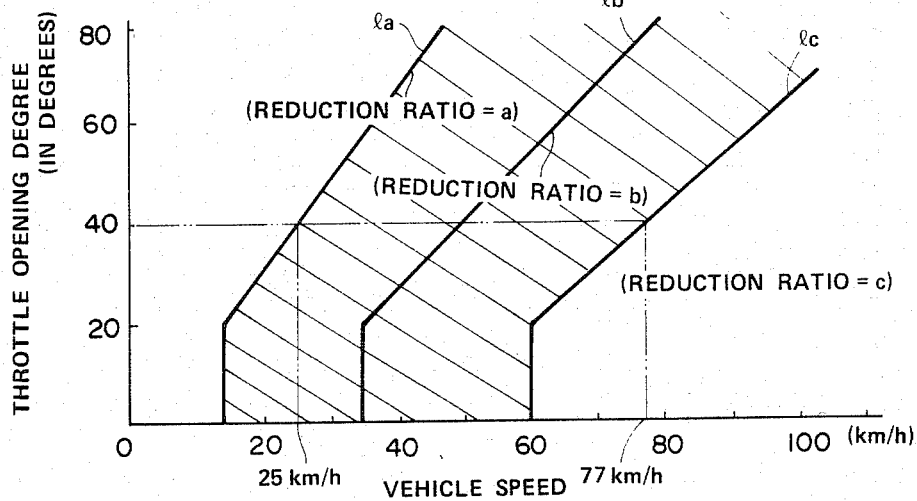
FIG. 17 is a graph showing the relationship shown in FIG. 16 expressed in terms of the throttle opening degree and vehicle speed for various reduction ratios.
Figure 18:
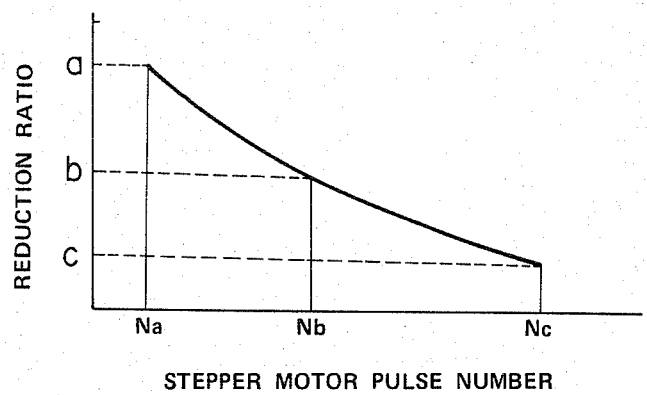
FIG. 18 is a graph showing a predetermined relationship of the reduction ratio with the stepper motor pulse number.
Figure 19:
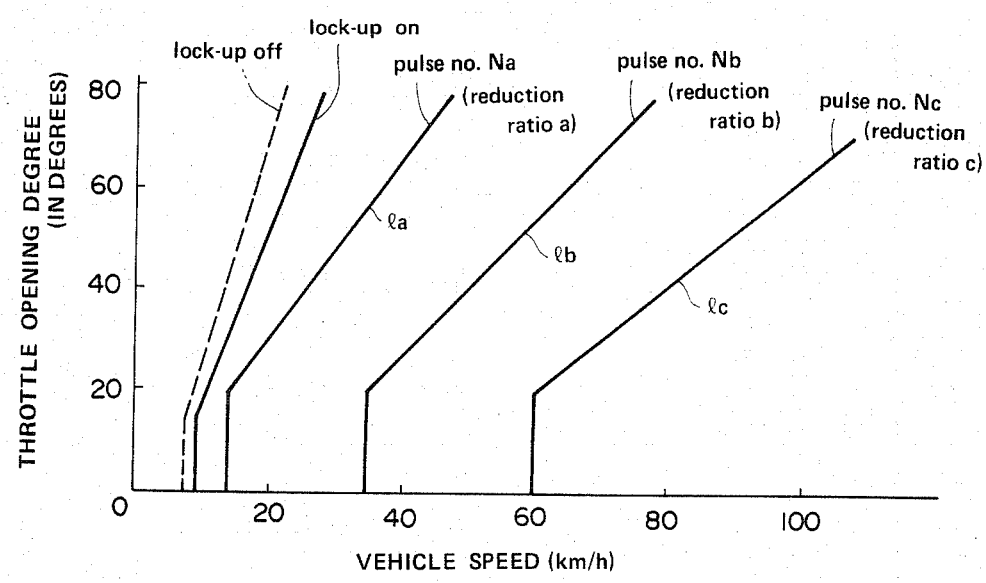
FIG. 19 is a graph showing a predetermined relationship shown in FIG. 16 expressed in terms of the throttle opening degree and vehicle speed for various pulse numbers.

Referring to FIG. 15, the engine performance curve is shown. In FIG. 15, engine revolution speed is expressed on the axis of abscissas and engine torque on the axis of ordinates and there are shown engine torque vs., engine revolution speed characteristic curves, each for a throttle opening degree (each curve being accompanied by a throttle opening degree) and there are also shown isofuel consumption rate curves FC1~FC8 (fuel consumption rate reducing in this numerical order). In FIG. 15, the minimum fuel consumption rate curve is denoted by the character G and the most efficient operational state is obtained if the engine is operated on this curve G. In order to control the continuously variable transmission so as to operate the engine along the minimum fuel consumption rate curve G, the pulse number data ND for the stepper motor 110 are determined in the following manner. If the minimum fuel consumption rate curve G is expressed in terms of throttle opening degree and engine revolution speed, the result may be expressed in FIG. 16. As will be understood, a single engine revolution speed is given for any throttle opening degree. For example, the engine revolution speed 3000 rpm is given for the throttle opening degree 40°. As shown in FIG. 16, the minimum engine revolution speed 1000 rpm is given for low throttle opening degrees (smaller than about 20 degrees) since the drive system of the continuously variable transmission would exhibit resonance with the engine vibration if the lockup clutch is engaged with the engine revolution speeds below this minimum engine revolution speed. Assuming engine revolution speed is N and vehicle speed V, then the reduction ratio S is given by the equation:

$$S = (N/V) \cdot k$$

where, k denotes a constant determined by the final reduction ratio and the radius of the tire. It will now be understood from the above equation and FIG. 16 that the desired optimum reduction ratio is determined by the vehicle speed V and the target engine revolution speed N which satisfies a predetermined relationship with the throttle opening degrees, i.e., engine load, as shown in FIG. 16. If the relationship shown in FIG. 16 is expressed in terms of vehicle speed rather than the engine revolution speed, the result may be expressed as shown in FIG. 17. Even with the same engine revolution speed, the vehicle speed differs from reduction ratio to reduction ratio and this fact is expressed in terms of a range of vehicle speed as shown in FIG. 17. Line la denotes the variation upon selecting the largest reduction ratio (reduction ratio a), and line lc denotes the variation upon selecting the smallest reduction ratio (reduction ratio c), where line lb denotes the variation upon selecting an intermediate reduction ratio b. For example, the vehicle can run at vehicle speeds from 25 km/h to 77 km/h with the throttle opening degree 40 while the reduction ratio decreases. The reduction ratio remains at a below 25 km/h and at c above 77 km/h with the throttle opening degree 40. A predetermined relationship exists between the position of the sleeve 162 of the shift operating mechanism 112 and a reduction ratio. This means that a predetermined relationship exists between the stepper motor pulse number applied to the stepper motor 110 (i.e., rotary position of the stepper motor 110) and the reduction ratio as shown in FIG. 18. Thus, the reduction ratios (a or b or c) shown in FIG. 17 can be converted into respective pulse numbers using the graph shown in FIG. 18. The result of this conversion is illustrated in FIG. 19. Also shown in FIG. 19 are the lock-up on and lock-up off vehicle speed lines shown in FIG. 8 from which it will be understood that the lock-up on and lock-up off vehicle speed lines are disposed on the lower vehicle speed side of the line a with the largest reduction ratio a.

Control of the continuously variable transmission with the shift pattern illustrated in FIG. 19 is as follows. Upon moving off from a standstill, the continuously variable transmission is maintained at the largest reduction ratio and the torque converter 12 is held in the non lock-up state. Therefore, a traction force strong enough for moving the vehicle off from the standstill is given. When the vehicle speed exceeds the lock-up on line, the lock-up clutch 10 of the torque converter 12 (see FIG. 1) engages, thus putting the torque converter 12 in the lock-up state. When the vehicle speed exceeds the line la as a result of an increase in the vehicle speed, the reduction ratio continuously varies between the reduction ratio and the reduction ratio c in such a manner as to satisfy the relationship denoted by the minimum fuel consumption rate curve G shown in FIG. 15. For example, if the throttle opening degree is increased from a state where the vehicle is running at a constant vehicle speed with a constant throttle opening degree in an operating range falling between lines la and lc, the desired engine revolution speed changes and the desired pulse number changes with the change in the desired revolution speed as determined by the relationship illustrated in FIG. 16. The stepper motor 110 rotates to a new rotary position in response to the new desired stepper motor pulse number, establishing a new reduction ratio, thus allowing the actual engine revolution speed to agree with the new target engine revolution speed. The engine is controlled to operate along with the minimum fuel consumption rate curve G of the engine since, as described before, the stepper motor pulse number is determined to satisfy the minimum fuel consumption rate curve G of the engine. In this manner, the reduction ratio is controlled by controlling the stepper motor pulse number since each reduction ratio corresponds uniquely to a single stepper motor pulse number.

From the description above, it will be understood that the desired optimum reduction ratio is determined by the vehicle speed and the desired engine revolution speed which satisfies the predetermoned relationship with the engine load.

Figure 20:
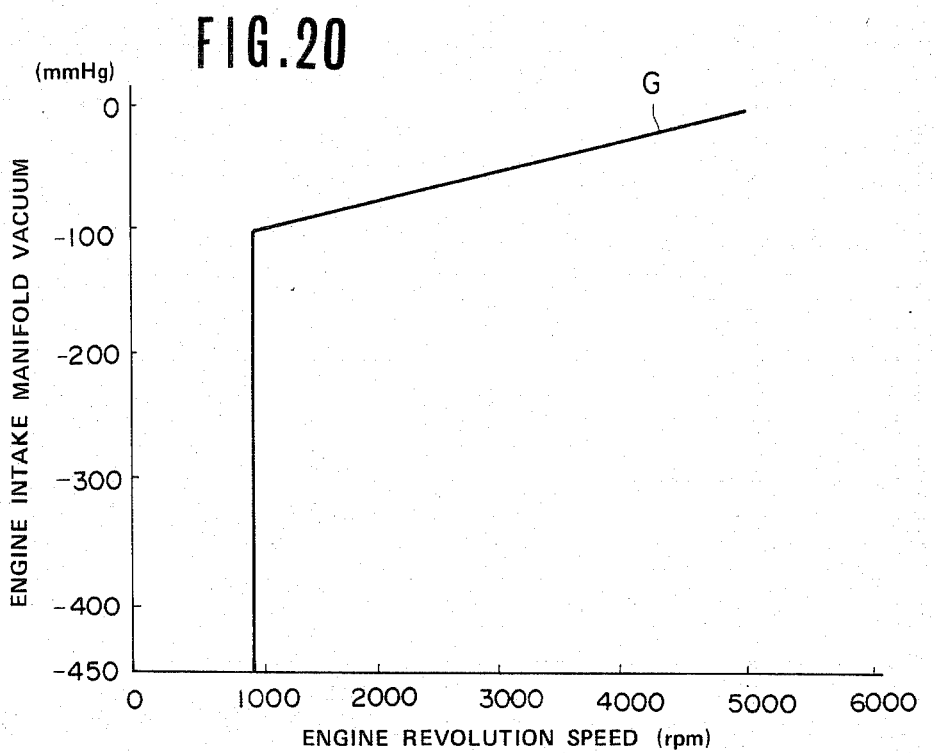
FIG. 20 is a graph showing the minimum fuel consumption rate curve expressed in terms of intake manifold vacuum and engine revolution speed.
Figure 21:
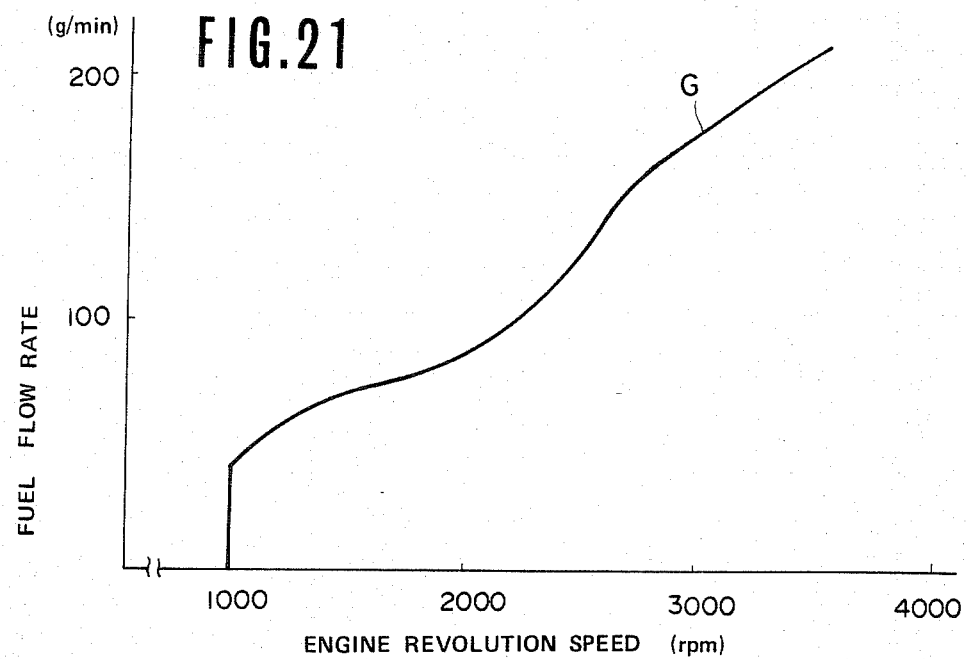
FIG. 21 is a graph showing the minimum fuel consumption rate curve expressed in terms of fuel flow rate.

In the embodiment described above, the control is based on the engine throttle opening degree, but it is also possible to carry out a similar control based on the intake manifold vacuum or the fuel flow rate. FIGS. 20 and 21 illustrate the minimum fuel consumption rate curves G for the latter two cases, respectively.

The above description has focused mainly on the shift pattern to be followed upon selecting the D range, but all that is necessary for operation in the L range or R range is to give data relating to different shift patterns from that in D range. For example, for the same throttle opening degree, a shift pattern for the L range is designed to give a larger reduction ratio as compared to the reduction ratio which is given by the shift pattern for the D range for the purpose of enhancing acceleration performance and ensuring adequate engine braking performance at zero throttle opening degree. In a shift pattern for the L range, a reduction ratio larger than the reduction ratio given by the shift pattern for the D range is given for the same throttle opening degree.

These shift patterns can be accomplished simply by inputting appropriate predetermined pulse data. A more detailed explanation of the operation in the L and R ranges is omitted since the basic actions carried out to effect the control are the same as in the D range.

Next, a brief explanation will be given as to the engine coolant temperature sensor 306 and the brake sensor 307 shown in FIG. 4.

The engine coolant temperature sensor 306 is switched "on" when the engine coolant temperature is below a predetermined value (for example, 60° C.). When the engine coolant temperature sensor 306 is in the "on" state, the shift pattern for the D range is switched in response to this signal to a shift pattern having larger reduction ratios. This eliminates irregular running of the engine and engine power shortage which otherwise would take place upon start-up of a cold engine.

The brake sensor 307 is switched "on" when the foot brake is actuated. If the brake sensor 307 is in the "on" state and at the same time the throttle opening degree is zero, the shift pattern for the D range is switched to a shift pattern giving larger reduction ratios. This ensures strong engine braking upon depressing the brake when operating in the D range.

Figure 22A:
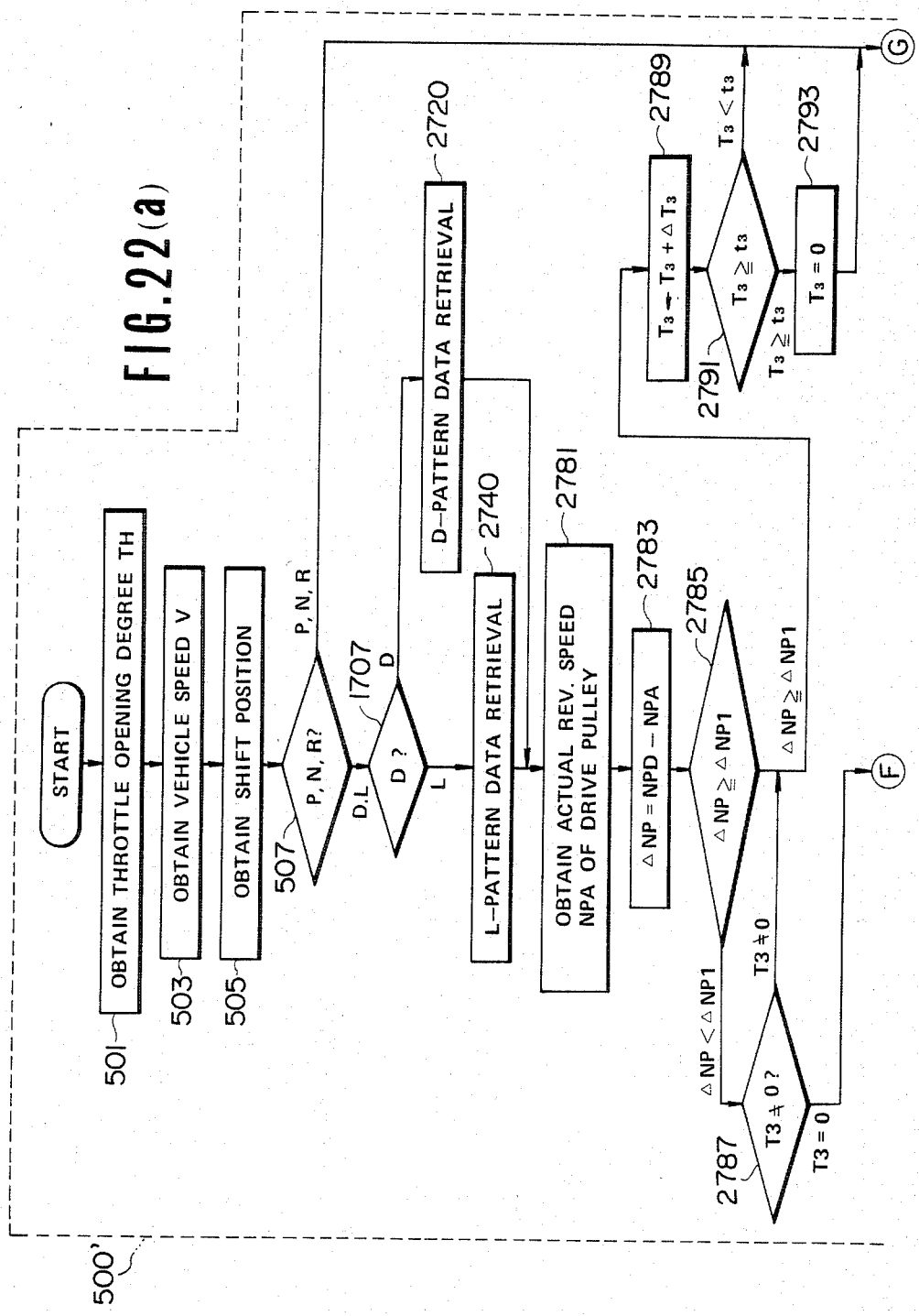
FIGS. 22(a) and 22(b) illustrate a flow chart of a lock-up control routine of a second embodiment according to the present invention.
Figure 22B:
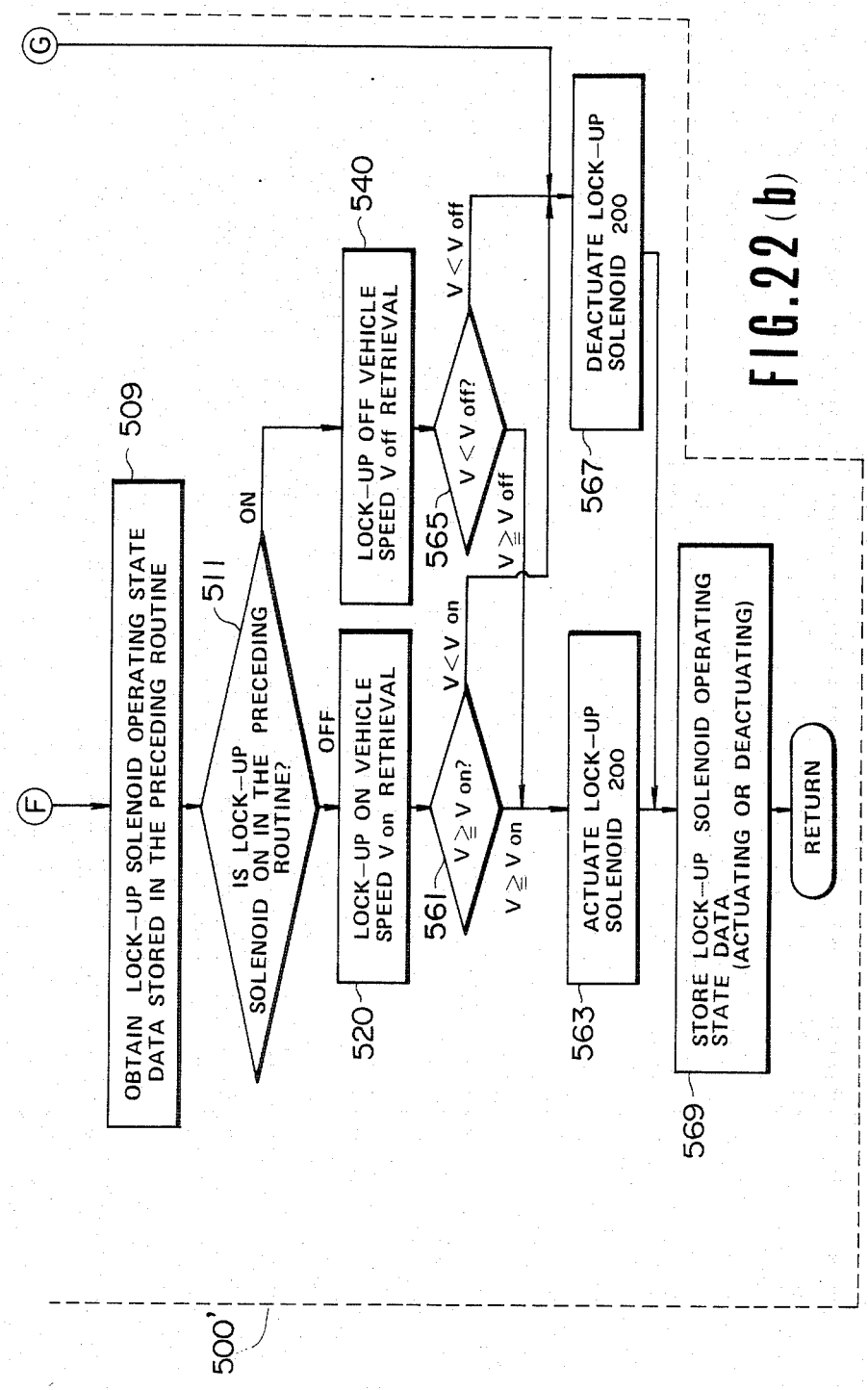

A second embodiment is described in connection with FIGS. 22(a) and 22(b). This embodiment uses a drive pulley revolution speed as a base for controlling a temporal release of the engagement of a lock-up clutch.

Steps from 501 to 1707 of a lock-up solenoid control routine 500' are identical to the counterparts of the first embodiment shown in FIGS. 5(a) and 5(b). It is also the same to retrieve a D range shift pattern and a L range shift pattern (steps 2720 and 2740), but it is different in that a ROM 314 (see FIG. 4) has stored therein desired revolution speed of a drive pulley 24 as data and a desired drive pulley revoution speed NPD is retrieved. Then, in a step 2781, an actual drive pulley revolution speed NPA is obtained from a drive pulley revolution speed sensor 1301 shown diagrammatically in FIG. 1. A difference $\Delta NP$ between the desired pulley revolution speed NPD and the actual drive pulley revolution speed NPA is computed in step 2783 by subtracting NPA from NPD. A determination is made whether NP is greater than or equal to a positive value $\Delta NP1$ or not in step 2785. If $\Delta NP$ is less than $\Delta NP1$ (i.e., in the case wherein a rapid down shift is not needed), a determination is made whether a timer T3 is zero or not in step 2787. The fact that the timer T3 is zero represents a state that the engagement of the lock-up clutch is not released, while the fact that the timer T3 is not zero represents a state that the engagement of the lock-up clutch is released temporarily. If the timer T3 is zero in step 2787, the program goes to step 509 and its following steps. The step 509 and its following steps are the same as the counterparts in FIGS. 5(a) and 5(b). If, in step 2785, $\Delta NP$ is greater than or equal to $\Delta NP1$ (i.e., in the case a rapid down shift is needed) and, at the same time, T3 is not equal to zero (i.e., in the case the engagement of the lock-up clutch is released), the timer T3 is increased by a predetermined small value $\Delta T3$ in step 2789. A determination is made whether this timer T3 is greater than or equal to a predetermined lock-up temporal release time t3 in step 2791, and if T3 is less than t3 (i.e., the predetermined lock-up temporal release time has not been expired), the program goes to step 567 to deactuate the lock-up solenoid 200 to disengage the lock-up clutch. If, in step 2791, T3 is greater than or equal to t3 (i.e., in the case the lock-up temporal release time has expired), the timer T3 is given zero value in step 2793. As a result, in the next routine, the program goes to step 509 from the step 2787.

With the execution of a series of steps 2781 to 2791, the engagement of the lock-up clutch is released from the predetermined time t3 after the determination is made that the rapid down shift is needed. Thus, this embodiment provides for similar operation and effect to those of the previously described first embodiment. Because the release of the engagement of the lock-up clutch is assured for the predetermined time t3, a strong acceleration is provided.

Figure 23A:
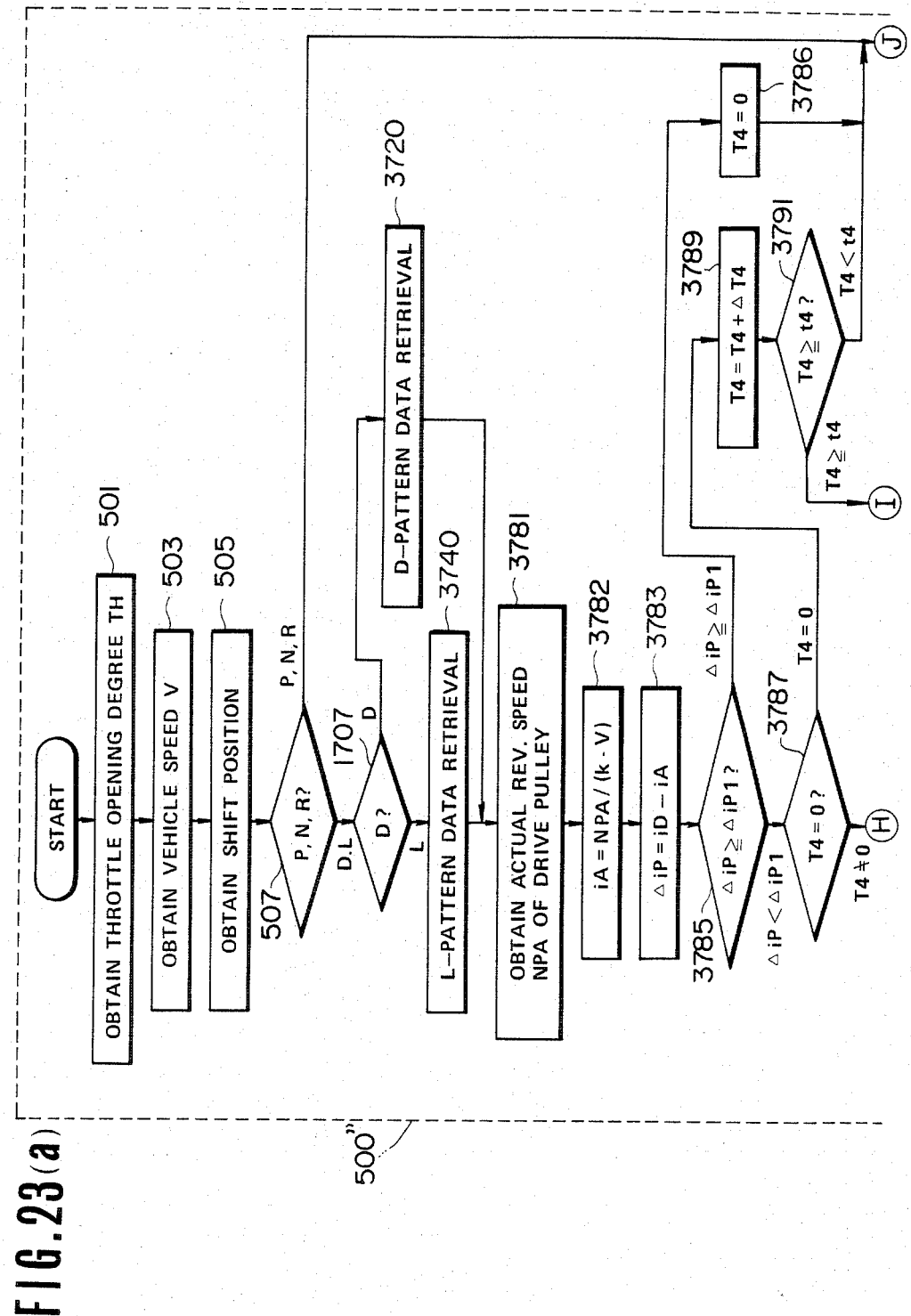
FIGS. 23(a) and 23(b) illustrate a flow chart of a lock-up control routine of a third embodiment according to the present invention.
Figure 23B:
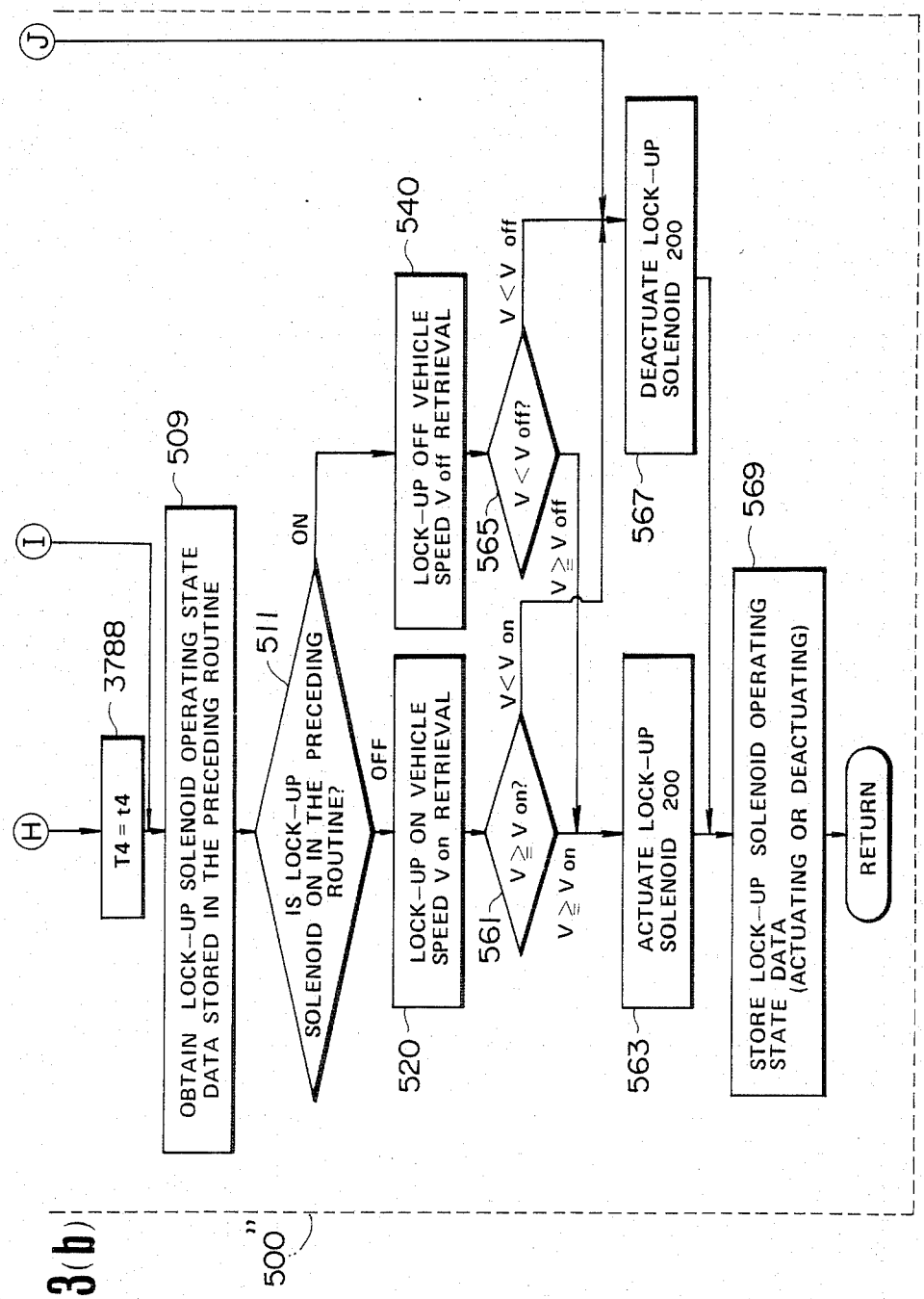

A third embodiment is described in connection with FIGS. 23(a) and 23(b). This embodiment uses a reduction ratio as a base for controlling the temporal release of the engagement of the lock-up clutch.

Steps 501 to 1707 of a lock-up solenoid control routine 500'' are identical to the counterparts of the first embodiment shown in FIGS. 5(a) and 5(b). It is also the same to retrieve a D range shift pattern and a L range shift pattern (steps 3720 and 3740), but it is different in that a ROM 314 has stored therein desired reduction ratio as data and a desired reduction ratio iD is retrieved. Then, in a step 3781, an actual drive pulley revolution speed NPA is obtained from a drive pulley revolution speed sensor 1301 (see FIG. 1). An actual reduction ratio iA is obtained from the actual drive pulley revolution speed NPA and vehicle speed V by computing the equation iA=NPA/(k·V) (k: constant) in step 3782. A difference ΔiP between iD and iA is computed in step 3783 by subtracting iA from iD. A determination is made whether ΔiP is greater than or equal to a predetermined positive value ΔiP1 or not in step 3785. If ΔiP is less than ΔiP1 (i.e., in the case a rapid down shifting is not needed), a determination is made whether a timer T4 is zero or not in step 3787. The fact that the timer T4 is zero represents a state that the engagement of the lock-up clutch is temporarily released, while the fact that the timer T4 is not zero represents a state that the engagement of the lock-up clutch is not released. If the timer T4 is not zero, the timer T4 is given a predetermined value t4 in step 3788 and then the program goes to step 509. The step 509 and its following steps are the same as the counterparts in FIGS. 5(a) and (b). If, in step 3785, ΔiP is greater or equal to ΔiP1 (i.e., in the case a rapid down shift is needed), the timer T4 is given zero in step 3786 and the program goes to a step 567 to deactuate the lock-up solenoid 200. If, at step 3787, T4 is equal to zero (i.e., the engagement of the lock-up clutch is temporarily released), the timer T4 is increased by a predetermined small value ΔT4 in step 3789, a determination is made whether the timer T4 is greater than or equal to a predetermined lock-up temporal release time t4 or not in step 3791, and if T4 is less than t4 (i.e., in the case the lock-up temporal release time has not yet expired), the program goes to step 567 to deactuate the lock-up solenoid 200. If, in step 3791, T4 is greater than or equal to t4 (i.e., the lock-up temporal release time has expired), the program goes to step 509.

With the execution of a series of steps 3781 to 3791, the engagement of the lock-up clutch is released for the predetermined time t4 after the determination is made that the rapid down shift is needed. Thus, this embodiment provides for similar operation and effect to those of the previously described first and second embodiments.

As described above, according to the present invention, the engagement of a lock-up clutch is released when a rapid acceleration is needed (i.e., when a rapid down shift is needed), allowing a hydrodynamic device to slip, thus allowing the engine to increase its speed for producing increased power output. In the case of a torque converter, a multiplied torque is obtained. As a result, the response to shifting demand has been enhanced and drive feel as well as safety have been improved owing to strong acceleration.

What is claimed is:

1. A method for controlling an automotive vehicle including an engine and a continuously variable transmission which includes a hydrodynamic device having an input element drivingly connected to the engine and an output element, a drive pulley drivingly connected to the output element, a driven pulley, the V-belt running over the drive and driven pulleys, and a lock-up clutch engageable to mechanically connect the input element with the output element, the transmission being shiftable between different reduction ratios and having a shift motor which is movable to different positions for effecting shifting to different reduction ratios, the method comprising:

detecting a demand for a rapid acceleration wherein a rapid down shift is needed and generating a rapid down shift need indicative signal; and disengaging the lock-up clutch in response to presence of said rapid down shift need indicative signal so as to allow the engine to increase its revolution speed during the down shift.

2. A method as claimed in claim 1, wherein said rapid down shift need indicative signal generating step includes:

generating an actual position indicative signal indicative of an actual position of the shift motor;

generating a desired position indicative signal representing a desired position of the shift motor;

computing a difference between said actual position indicative signal and said desired position indicative signal and generating a difference indicative signal representing said difference; and generating said rapid down shift need indicative signal when said difference indicative signal is greater than a predetermined value.

3. A method as claimed in claim 1, wherein said rapid down shift need indicative signal generating step includes:

generating an actual drive pulley revolution speed indicative signal representing an actual revolution speed of the drive pulley;

generating a desired drive pulley revolution speed indicative signal representing a desired revolution speed of the drive pulley;

computing a difference between said desired drive pulley revolution speed indicative signal and said actual drive pulley revolution speed indicative signal and generating a difference indicative signal representing said difference; and generating said rapid down shift need indicative signal when said difference indicative signal is greater than a predetermined value.

4. A method as claimed in claim 1, wherein said rapid down shift need indicative signal generating step includes:

generating an actual reduction ratio indicative signal representing an actual reduction ratio in the transmission;

generating a desired reduction ratio indicative signal representing a desired reduction ratio;

computing a difference between said desired reduction ratio indicative signal and said actual reduction ratio indicative signal and generating a difference indicative signal representing said difference; and generating said rapid down shift need indicative signal when said difference indicative signal is greater than a predetermined value.

5. A method as claimed in claim 1, wherein said lock-up clutch disengaging step is maintained for a predetermined time beginning with the detecting of said demand.

6. An apparatus for controlling a continuously variable transmission of an automotive vehicle having an internal combustion engine, the transmission including a hydrodynamic device having an input element and an output element, a drive pulley, a driven pulley, a V-belt running over the drive and driven pulleys, and a lock-up clutch engageable to mechanically connect the input element to said output element, the transmission being shiftable between different reduction ratios, the apparatus comprising:

means including a shift motor movable to different positions for shifting the transmission to different reduction ratios corresponding uniquely to said positions;

means for detecting a demand for a rapid acceleration wherein a rapid down shift is needed and generating a rapid down shift need indicative signal; and means for disengaging the lock-up clutch in response to presence of said rapid down shift need indicative signal to allow the engine to increase its revolution speed during the down shift.

7. An apparatus for controlling a continuously variable transmission of an automotive vehicle having an internal combustion engine, the transmission including a hydrodynamic device having an input element and an output element, a drive pulley, a driven pulley, a V-belt running over the drive and driven pulley, and a lock-up clutch engageable to mechanically connect the input element to the output element, the transmission being shiftable between reduction ratios, the apparatus comprising:

means for detecting a vehicle speed of the automotive vehicle and generating a vehicle speed indicative signal;

means for detecting an engine load on the internal combustion engine;

means for retrieving a desired optimum reduction ratio for the detected vehicle speed and engine load and generating a desired optimum reduction ratio indicative signal;

means for generating an actual reduction ratio indicative signal representing an actual reduction ratio of the continuously variable transmission;

means for computing a deviation of the desired optimum reduction ratio indicative signal from the actual reduction ratio indicative signal and generating a deviation indicative signal representing said deviation;

means for comparing said deviation with a predetermined value and generating a rapid down shift need indicative signal when said deviation is greater than said predetermined value;

a shift motor rotatable between a plurality of rotary positions thereof;

means operatively connected to said shift motor to be actuated thereby for shifting the transmission to a reduction ratio corresponding to one of the plurality of rotary positions of said shift motor assumed by said shift motor;

means responsive to said vehicle speed indicative signal for engaging the lock-up clutch; and means for disengaging the lock-up clutch temporarily in response to said rapid down shift need indicative signal so as to allow the engine to increase its revolution speed during the rapid down shift.

8. An apparatus as claimed in claim 7, wherein said desired optimum reduction ratio indicative signal and said actual reduction ratio indicative signal are expressed in terms of the number of pulses supplied to said shift motor.

9. An apparatus as claimed in claim 7, wherein said desired optimum reduction ratio indicative signal and said actual reduction ratio indicative signal are expressed in terms of the revolution speed of the drive pulley.

10. An apparatus as claimed in claim 7, wherein said desired optimum reduction ratio indicative signal and said actual reduction ratio indicative signal are expressed in terms of the reduction ratio of the transmission.

11. A method for controlling an automotive vehicle including an engine and a continuously variable transmission which includes a torque converter having an input element drivingly connected to the engine and an output element, a drive pulley drivingly connected to the output element, a driven pulley, a V-belt running over the drive and driven pulleys, and a lock-up clutch engageable to mechanically connect the input element with the output element, the transmission being shiftable between different reduction ratios continuously, the method comprising:

a first step of detecting an operating condition of the automotive vehicle and generating an operating condition indicative signal;

a second step of retreiving a desired value indicative of a desired reduction ratio in response to said operating condition indicative signal and generating a desired value indicative signal;

a third step of obtaining an actual value indicative of an actual reduction ratio in the continuously variable transmission and generating an actual value indicative signal;

a fourth step of computing a deviation of said desired value indicative signal from said actual value indicative signal and generating a deviation indicative signal;

a fifth step of comparing said deviation indicative signal with a predetermined reference;

a sixth step of disengaging the lock-up clutch; and repeating a routine including said first, second, third, fourth, fifth and sixth steps when said deviation indicative signal satisfies a predetermined relationship with said predetermined reference.

12. A method for controlling an automotive vehicle including an engine and a continuously variable transmission which includes a torque converter having an input element drivingly connected to the engine and an output element, a drive pulley drivingly connected to the output element, a driven pulley, a V-belt running over the drive and driven pulleys, and a lock-up clutch engageable to mechanically connect the input element with the output element, the transmission being shiftable between different reduction ratios continuously, the method comprising:
- a first step of detecting an operating condition of the automotive vehicle and generating an operating condition indicative signal;
- a second step of retrieving a desired value indicative of a desired reduction ratio in response to said operating condition indicative signal and generating a desired value indicative signal;
- a third step of obtaining an actual value indicative of an actual reduction ratio in the continuously variable transmission and generating an actual value indicative signal;
- a fourth step of computing a deviation of said desired value indicative signal from said actual value indicative signal and generating a deviation indicative signal;
- a fifth step of comparing said deviation indicative signal with a predetermined reference;
- a sixth step of increasing a timer by a predetermined timer value;
- a seventh step of comparing the timer with a predetermined elapse time;
- an eighth step of disengaging the lock-up clutch;
- a ninth step of setting the timer to zero;
- a tenth step of comparing the timer with zero; and
- repeating a first routine including said first, second, third, fourth, fifth, sixth, seventh and eighth steps when said deviation indicative signal satisfies a predetermined relationship with said predetermined reference and said timer is less than said predetermined elapse time;
- repeating a second routine including said first, second, third, fouth, fifth, sixth, seventh, ninth and eighth steps when said deviation indicative signal satisfies said predetermined relationship with said predetermined reference and said timer is not less than said predetermined elapse time; and
- repeating a third routine including said first, second, third, fourth, fifth, tenth, sixth, seventh steps when said timer is less than said predetermined elapse time even when said deviation indicative signal fails to satisfy said predetermined relationship with said predetermined reference.

* * * * *